US012591792B2

(12) United States Patent
Shrivastava et al.

(10) Patent No.: US 12,591,792 B2
(45) Date of Patent: Mar. 31, 2026

(54) DYNAMICALLY ENRICHING SHARED KNOWLEDGE GRAPHS

(71) Applicant: Microsoft Technology Licensing, LLC, Redmond, WA (US)

(72) Inventors: Harsh Shrivastava, Redmond, WA (US); Sarah Panda, Bothell, WA (US); Liang Du, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 665 days.

(21) Appl. No.: 18/079,407

(22) Filed: Dec. 12, 2022

(65) Prior Publication Data

US 2024/0193440 A1     Jun. 13, 2024

(51) Int. Cl.
*G06N 5/00*          (2023.01)
*G06N 5/022*         (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS

| | | | | | |
|---|---|---|---|---|---|
| 11,182,748 | B1 * | 11/2021 | Neckermann | .......... | G06N 5/022 |
| 12,327,197 | B2 * | 6/2025 | Lee | .................... | G06Q 30/0269 |

| | | | | | |
|---|---|---|---|---|---|
| 2019/0278777 | A1 * | 9/2019 | Malik | ................. | G06F 16/9024 |
| 2020/0118010 | A1 * | 4/2020 | Lee | ......................... | G06N 5/022 |
| 2020/0159867 | A1 * | 5/2020 | Sharma | ............... | G06F 16/3347 |
| 2020/0167786 | A1 * | 5/2020 | Kursun | .................... | H04L 63/08 |
| 2020/0169483 | A1 * | 5/2020 | Kursun | .............. | G06Q 20/3678 |
| 2022/0051090 | A1 * | 2/2022 | Giovannini | ............ | G06N 3/042 |
| 2022/0327356 | A1 * | 10/2022 | Rossiello | ............... | G06N 3/088 |
| 2022/0351059 | A1 * | 11/2022 | Hoang | ..................... | G06N 3/04 |
| 2023/0359943 | A1 * | 11/2023 | Nguyen | ................. | G06N 5/022 |

OTHER PUBLICATIONS

International Search Report and Written Opinion received for PCT Application No. PCT/US2023/081027, Mar. 15, 2024, 17 pages.

* cited by examiner

*Primary Examiner* — Farhan M Syed

(74) *Attorney, Agent, or Firm* — Ray Quinney & Nebeker P.C.; Christopher K. Hallstrom

(57)          ABSTRACT

The present disclosure relates to utilizing a dynamic knowledge graph enrichment system to dynamically and automatically maintain knowledge graphs shared between groups of user identifiers with up-to-date findings and discoveries. In particular, the dynamic knowledge graph enrichment system changes static shared knowledge graphs into dynamically evolving ones utilizing statistical guarantees that automatically incorporate new edge connections into a shared knowledge graph after verifying the reliability and veracity of the proposed edge connections being offered. Further, the dynamic knowledge graph enrichment system facilitates forming new connections between different shared knowledge graphs that previously went undetected by flexibly facilitating exploration over multiple knowledge graphs and providing synergistic knowledge graph updates.

20 Claims, 11 Drawing Sheets

200

220

Dynamic Shared Relationship Table _420_

| 1st Node | 2nd Node | Relationship Type | Edge Interaction Count | ID Authority | Feedback | Negative Link? | Confidence Value | Display? |
|---|---|---|---|---|---|---|---|---|
| Cat | Dog | Pets | 7 | 8/10 | ✓ | | 75% | Yes |
| Cat | Dog | Animal | 12 | 8/10 | ✓ | | 100% | Yes |
| Cat | Tiger | Felines | 2 | 5/10 | | | 33% | No |
| Cat | Chair | Animal | 1 | 3/10 | ✗ | Yes | 2% | Remove |
| ... | ... | ... | ... | ... | ... | ... | ... | ... |

FIG. 4B

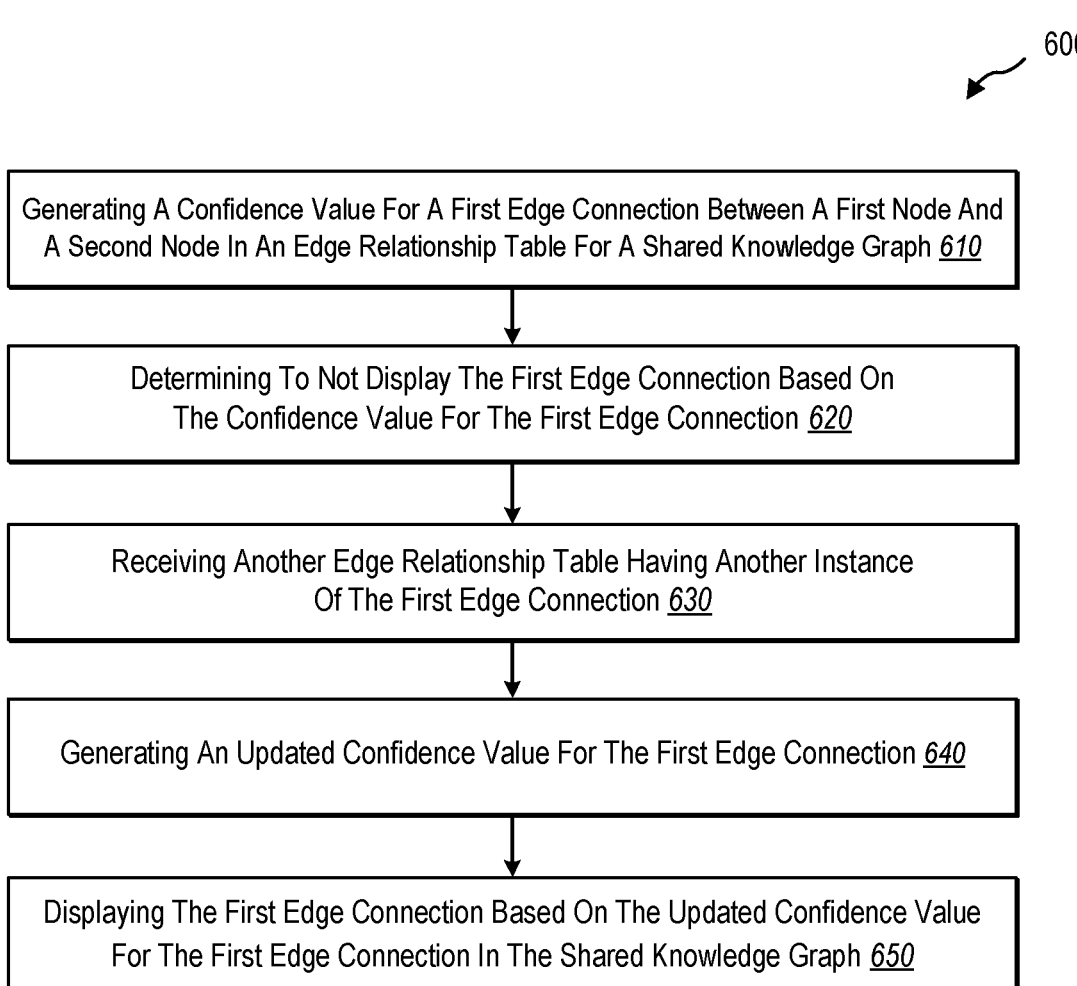

600

Generating A Confidence Value For A First Edge Connection Between A First Node And A Second Node In An Edge Relationship Table For A Shared Knowledge Graph *610*

Determining To Not Display The First Edge Connection Based On The Confidence Value For The First Edge Connection *620*

Receiving Another Edge Relationship Table Having Another Instance Of The First Edge Connection *630*

Generating An Updated Confidence Value For The First Edge Connection *640*

Displaying The First Edge Connection Based On The Updated Confidence Value For The First Edge Connection In The Shared Knowledge Graph *650*

FIG. 6

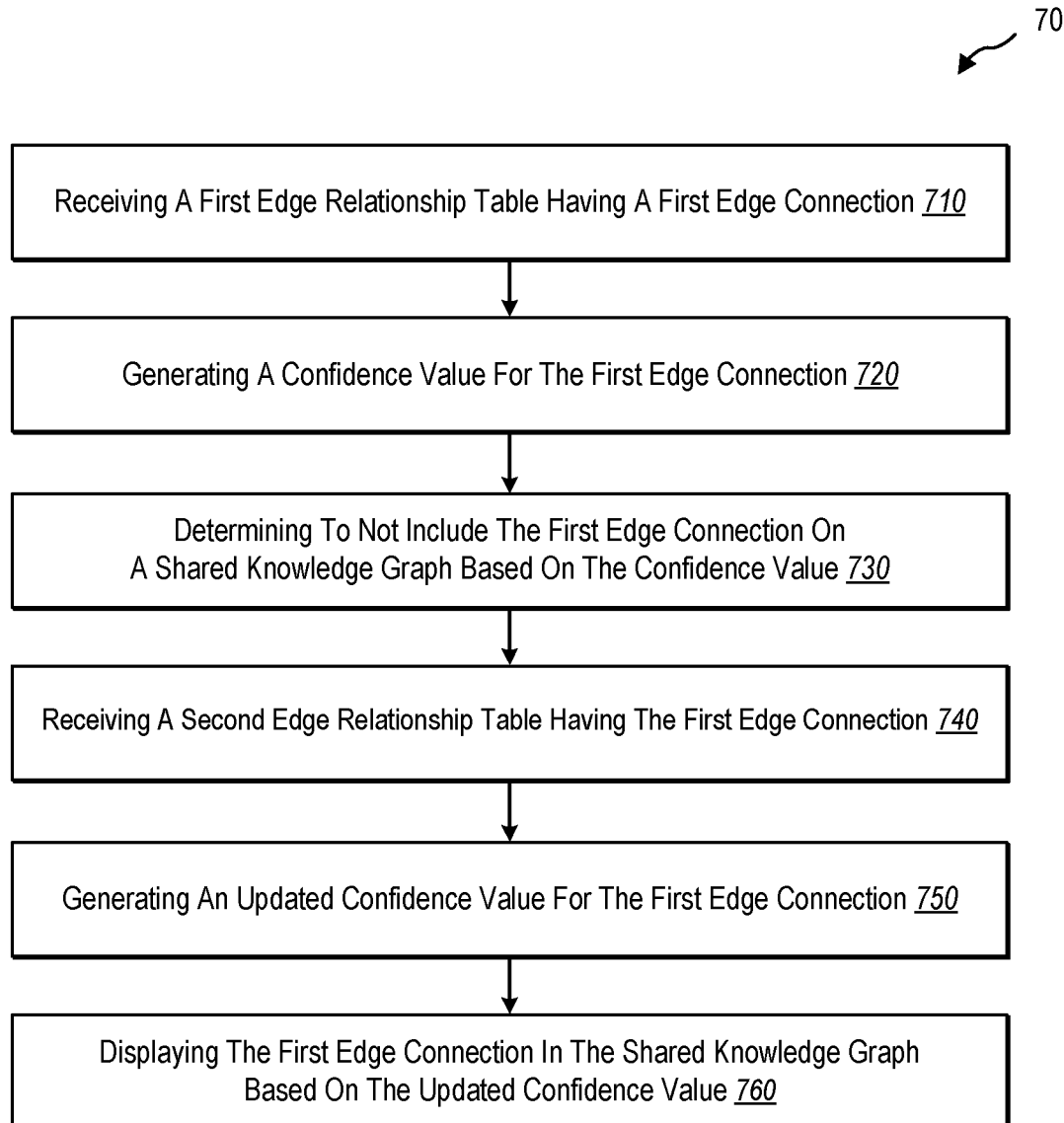

700

Receiving A First Edge Relationship Table Having A First Edge Connection *710*

Generating A Confidence Value For The First Edge Connection *720*

Determining To Not Include The First Edge Connection On
A Shared Knowledge Graph Based On The Confidence Value *730*

Receiving A Second Edge Relationship Table Having The First Edge Connection *740*

Generating An Updated Confidence Value For The First Edge Connection *750*

Displaying The First Edge Connection In The Shared Knowledge Graph
Based On The Updated Confidence Value *760*

FIG. 7

DYNAMICALLY ENRICHING SHARED KNOWLEDGE GRAPHS

BACKGROUND

Recent years have seen significant advancements in both hardware and software with respect to accessing, managing, and sharing digital content. For instance, modern computing systems allow researchers and other individuals to identify, access, and utilize large collections of digital content. Indeed, modern computing systems provide the processing power, memory, and connectivity needed to process large collections of digital content, such as generating and providing knowledge graphs that show relationships between elements (e.g., nodes) using links (e.g., edges). Indeed, a knowledge graph can serve as an important tool to understand massive data in a compressed manner. Additionally, a knowledge graph can be shared among researchers (e.g., shared knowledge graphs) to facilitate the collaboration of information and new discoveries.

Despite these and other advances, existing computing systems face several technical shortcomings that result in inaccurate and inflexible computing operations, particularly in the area of utilizing and maintaining shared knowledge graphs. For example, many existing computer systems implement schemes that prevent regular updates of shared knowledge graphs, which causes these systems to operate on inaccurate and outdated information. Indeed, new discoveries are being published, verified, and shared almost daily, however, existing computer systems remain static for months and often years before updates are manually added or implemented.

This delay is increasingly problematic when a shared knowledge graph focuses on understanding important topics, such as those related to worldwide pandemics. Indeed, existing computer systems lack the mechanisms and processes for quickly, accurately, and flexibly updating shared knowledge graphs among researchers. Accordingly, these and other problems showcase significant technical problems of existing computing systems with knowledge graph management.

BRIEF DESCRIPTION OF THE DRAWINGS

The detailed description provides one or more implementations with additional specificity and detail through the use of the accompanying drawings, as briefly described below.

FIGS. 4A-4B illustrate example diagrams for utilizing an edge confidence value model to update shared knowledge graphs in accordance with one or more implementations.

FIG. 6 illustrates an example series of acts for dynamically and automatically updating a shared knowledge graph in accordance with one or more implementations.

FIG. 7 illustrates another example series of acts for dynamically and automatically updating a shared knowledge graph in accordance with one or more implementations.

DETAILED DESCRIPTION

Figure 1:
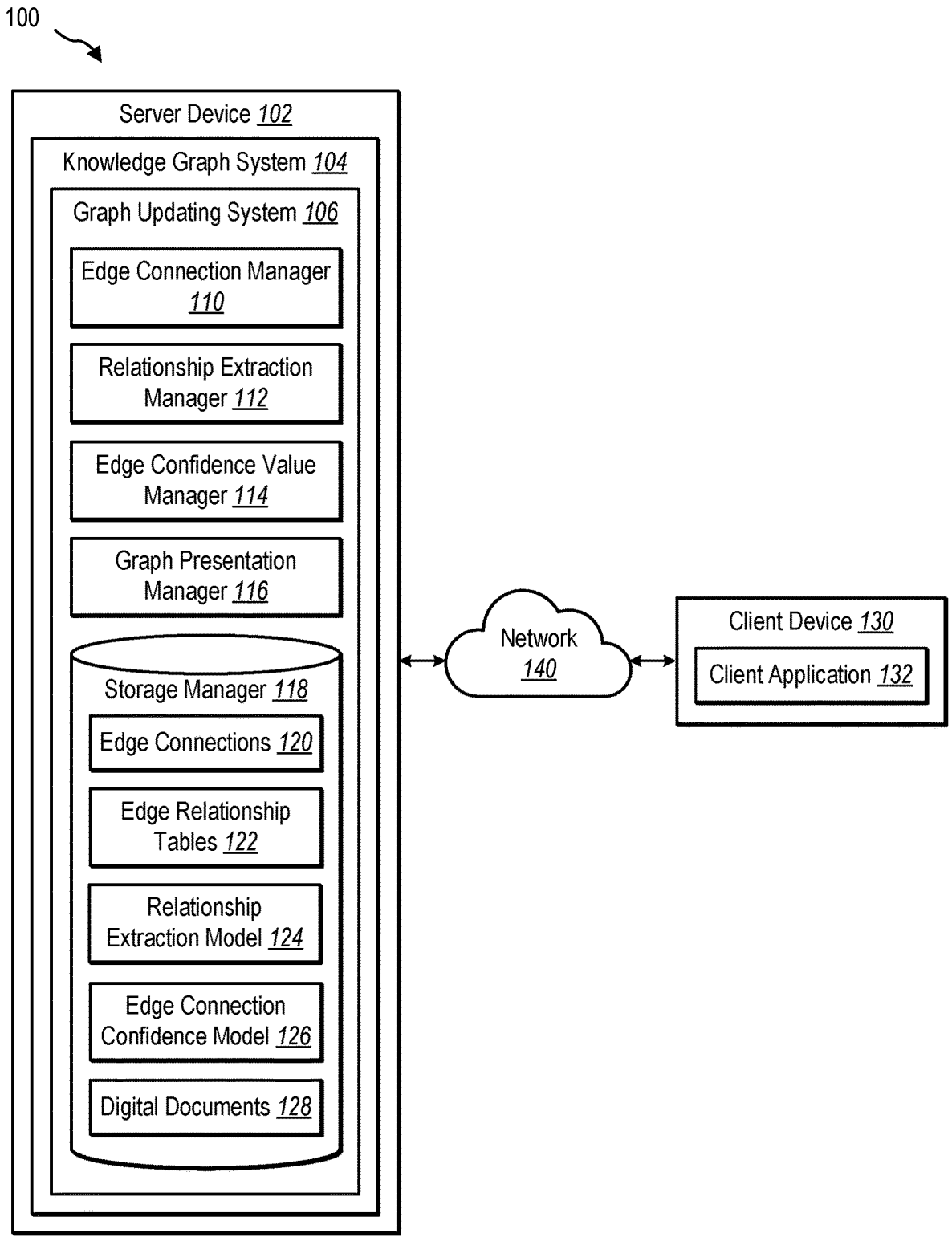
FIG. 1 illustrates an example diagram of a computing system environment where a graph updating system (i.e., a dynamic knowledge graph enrichment system) is implemented in accordance with one or more implementations.

This document describes utilizing a dynamic knowledge graph enrichment system (a "graph updating system" for short) to dynamically and automatically update knowledge graphs shared between groups of users (i.e., shared knowledge graphs) with up-to-date findings and discoveries. In particular, the graph updating system changes static shared knowledge graphs into dynamically evolving ones utilizing statistical guarantees that automatically incorporate new edge connections into a shared knowledge graph after verifying the reliability and veracity of the proposed edge connections being offered. Further, the graph updating system facilitates forming new connections between different shared knowledge graphs that previously went undetected by flexibly facilitating exploration over multiple knowledge graphs and providing synergistic knowledge graph updates.

Indeed, implementations of the present disclosure solve one or more of the problems mentioned above as well as other problems in the art with systems, computer-readable media, and methods by utilizing the graph updating system to dynamically and automatically updates shared knowledge graphs with valid and reliable newly discovered information. Further, the graph updating system generates and executes various knowledge graph models to identify, process, validate, and transform proposed information associated with individual sources into a common, combined, and verified central shared knowledge graph.

By way of context, knowledge graphs include nodes that correspond to topics, concepts, facts, and other pieces of information. Where appropriate, nodes are connected via edges, which represent relationships between nodes. In this manner, a knowledge graph reveals the domain structure of a complex information system by visually showing dependencies between sets of ideas. Additionally, knowledge graphs are used in many domains, including medical diagnosis, fault detection, analysis of genomic data via gene regulatory networks, speech recognition, and financial applications. However, as indicated above, despite critical information being discovered and shared frequently, shared knowledge graphs are infrequently updated leaving them habitually out-of-date.

Returning to the dynamic knowledge graph enrichment system (e.g., a "graph updating system"), in one or more implementations, the graph updating system maintains an edge relationship table that corresponds to displaying a shared knowledge graph having nodes and edges. As part of determining whether to display edge connections in the shared knowledge graph, the graph updating system generates confidence values for the edge connections. For instance, based on generating a confidence value for a first edge connection (between a first node and a second node) that is below an edge displaying threshold, the graph updating system determines to not display the first edge connection on the shared knowledge graph.

Continuing from the above paragraph, the graph updating system later receives a new edge relationship table (e.g., from a user identifier) where the new edge relationship table includes another instance of the first edge connection between the first node and the second node. In response to receiving the new edge relationship table and incorporating the entry of the first edge connection to the edge relationship table, the graph updating system generates an updated confidence value for the first edge connection within the edge relationship table. Additionally, based on determining that the updated confidence value for the first edge connection now satisfies the edge displaying threshold, the graph updating system displays the first edge connection in the shared knowledge graph within a graphical user interface.

As another illustration, in various implementations, the graph updating system receives a first edge relationship table having a first edge connection for connecting a first node and a second node according to a first edge relationship type and the graph updating system generates a confidence value for the first edge connection based on a first set of attributes of the first edge relationship table. However, upon determining that the confidence value of the first edge connection does not satisfy an edge displaying threshold, the graph updating system displays a shared knowledge graph without the first edge connection. Upon receiving a second edge relationship table having the first edge connection connecting the first node and the second node according to the first edge relationship type, the graph updating system generates an updated confidence value for the first edge connection. For example, the graph updating system generates the updated confidence value based on the first set of attributes from the first edge relationship table as well as a second set of attributes from the second edge relationship table. Further, the graph updating system displays the shared knowledge graph with the first edge connection based on the updated confidence value satisfying the edge displaying threshold.

As described herein, the graph updating system provides several technical benefits with respect to image dataset generation when compared to existing computing systems. Indeed, the graph updating system provides several practical applications that deliver benefits and/or solve problems by providing systems and methods for dynamically evolving a shared knowledge graph to automatically update with accurate and corroborated information. Some of these technical benefits and practical applications are discussed next as well as through this document.

As noted above, the inflexibility of existing computer systems lacking the ability to frequently update shared knowledge graphs leaves these knowledge graphs with inaccurate and out-of-date information. Indeed, despite a shared knowledge graph being accessed by multiple reputable user identifiers (i.e., users associated with user identifiers), existing computer systems restrict modifying a shared knowledge graph to the creator user identifier. Because of this ridged inflexibility of existing computer systems and because existing computer systems do not provide adequate tools for updating knowledge graphs, shared knowledge graphs quickly become stale and inaccurate. Due to the large amounts of accumulating information, it is not uncommon for a shared knowledge graph to go over a year before being updated, as updates require manually sorting through the large accumulations of information and individually deciding which information to add as well as where to add the information to a shared knowledge graph.

In contrast, the graph updating system performs a number of actions to both overcome and improve upon these problems. To elaborate, the graph updating system dynamically and automatically updates shared knowledge graphs with accurate and corroborated information. In this manner, the graph updating system provides technical flexibility where existing computer systems were previously limited. For example, the graph updating system automatically receives and identifies changes that occur within new knowledge graphs of user identifiers and tracks when a particular change is occurring across multiple user identifiers. Then, when a new connection (e.g., a node and/or edge) reaches a particular threshold, the graph updating system dynamically adds the new connection to the shared knowledge graph, without waiting for manual user intervention. Similarly, the graph updating system dynamically removes connections from a shared knowledge graph as more information is revealed showing the existing connection to be inaccurate.

Additionally, in various implementations, the graph updating system utilizes an edge confidence value model to determine the confidence values of edge connections. By utilizing an edge confidence value model, the graph updating system improves both efficiency and accuracy over existing computer systems. In particular, the graph updating system utilizes an edge confidence value model to determine confidence values for edge connections included in relationship tables provided by user identifiers. Each time an edge connection (e.g., a connection between two nodes defined by a given relationship) is identified, the graph updates a shared relationship table with the edge connection. Then, the graph updating system determines an updated current confidence value for the edge connection. Based on the confidence value, the graph updating system determines to include or exclude the edge connection from a shared knowledge graph.

Further, by utilizing an edge confidence value model, the graph updating system improves the flexibility over existing computer systems. For example, the shared relationship table includes characteristics and attributes (e.g., factors) for each edge connection. When the same edge connection is identified, the characteristics and attributes of the edge connection are updated. Then, the graph updating system determines an updated confidence value for the edge connection based on the updated characteristics, attributes, and statistics. In this manner, as an edge connection appears more frequently, from a reliable source, and/or based on a number of other factors, the graph updating system updates its confidence value accordingly. Only after the confidence value satisfies an edge displaying threshold does the graph updating system determine to include it in a shared knowledge graph, which is done dynamically without needing user intervention.

To reiterate some of the above benefits, the graph updating system quickly performs these actions as new information is discovered and identified, rather than after waiting for it to accumulate in large and unwieldy amounts. Indeed, the graph updating system updates shared knowledge graphs with relevant and often critical and time-sensitive information as soon as the information is statistically guaranteed and corroborated by rebuttable sources. Accordingly, the graph updating system enables newly discovered information to be rapidly shared with necessary user identifiers via the dynamically updated shared knowledge graphs.

The graph updating system also provides several other technical benefits that are provided herein. For example, the graph updating system improves the accuracy and the flexibility of computer systems by generating new relationship tables for user identifiers from digital documents as well as corresponding user-specific knowledge graphs. Additionally, the graph updating system improves the accuracy and the flexibility of computer systems by generating and providing extended knowledge graphs that combine user-specific knowledge graphs with portions of shared knowledge graphs (e.g., knowledge sub-graphs). Further, the graph updating system improves the accuracy and the flexibility of computer systems by determining characteristics and attributes of edge connections and distributing them to the graph updating system to more accurately determine confidence values for the edge connections.

As illustrated in the foregoing discussion, this document utilizes a variety of terms to describe the features and advantages of one or more implementations described herein. These terms are defined below as well as used throughout the document in different examples and contexts.

To illustrate, as an example of a term used in this document, the term "knowledge graph" refers to a data structure that indicates relationships between variables (e.g., concepts, topics, facts, elements, ideas, or features) within a dataset. In this document, a knowledge graph includes nodes (i.e., elements, variables, concepts, features, or ideas) connected by edges (aka edge connections or edges) that represent relationships between. Nodes can be connected directly (i.e., via a single edge) or connected indirectly (i.e., via a sequence of edges and intermediary nodes).

In many implementations, a knowledge graph is represented visually, such as within an interactive interface. In addition, a knowledge graph may include different visual effects (e.g., colors, thicknesses, patterns, etc.) to show magnitudes of connection strength or other correlation scores between nodes (e.g., concepts, features, ideas, and/or variables). Examples of knowledge graphs include network graphs, multiplex graphs, heterogeneous graphs, hypergraphs, directed graphs, and/or undirected graphs. In some implementations, a network graph is maintained with a database or other storage medium as interconnected elements. An example of a knowledge graph is a graph of nodes that represent prescription drugs having edges between various nodes that show side effects when the two prescription drugs are taken together.

This document describes various types of knowledge graphs. For example, knowledge graphs include shared knowledge graphs, knowledge sub-graphs, new knowledge graphs, and extended knowledge graphs. "Shared knowledge graphs" refer to large knowledge graphs that are accessible (e.g., shared) to multiple user identifiers. Often, a shared knowledge graph visually portrays massive datasets with contributions from many different user identifiers (e.g., individual user identifiers, groups of user identifiers, and entities). "Knowledge sub-graphs" refer to portions of a shared knowledge graph. "New knowledge graphs" refer to newly generated knowledge graphs that are specific to a user identifier (or a limited set of user identifiers). New knowledge graphs are often smaller and correspond to a smaller dataset. "Extended knowledge graphs" refer to new knowledge graphs that are combined with knowledge sub-graphs. Examples of each graph knowledge graph type are provided below.

As another example, in this document, the term "edge relationship table" (or simply "relationship table") refers to a data structure that stores connections (i.e., edges) between nodes. For example, an edge relationship table is an edge list that indicates how pairs of nodes are related. In various implementations, a relationship table includes additional information, such as the characteristics and attributes of an edge connection. In various implementations, a relationship table is used to display nodes and edges in a knowledge graph (or indicate which edge connections to display). For instance, a knowledge graph is generated and displayed based on a corresponding relationship table. In some implementations, a relationship table is maintained separately from a knowledge graph.

The term "edge connection confidence value" (or simply "confidence value") in this document, as an example, refers to a metric for measuring the veracity of an edge connection. As provided below, the graph updating system determines the confidence value of an edge connection based on corresponding factors. Based on the confidence value, the graph updating system determines to include, exclude, remove, display, and/or hide an edge connection from a corresponding knowledge graph. In some implementations, the confidence value is compared with one or more edge display thresholds to determine how to manage an edge connection.

As another example, in various implementations, the graph updating system utilizes an edge confidence value model to determine a confidence value from one or more factors. In some implementations, the edge confidence value model is a machine-learning model, such as an edge confidence value neural network that outputs a confidence value based on various inputs corresponding to the edge connection.

Additional details will now be provided regarding the graph updating system. To illustrate, FIG. 1 shows a schematic diagram of an environment 100 (e.g., a digital medium system environment) for implementing a graph updating system 106 (i.e., a dynamic knowledge graph enrichment system). In particular, FIG. 1 introduces example components and elements that help better explain the functions, operations, and actions of the graph updating system 106. Additionally, FIG. 1 includes various details regarding components and elements of the graph updating system 106.

As illustrated in FIG. 1, the environment 100 includes a server device 102 and a client device 130 that each communicates with each other via a network 140. While not shown, the environment 100 may include additional devices, such as multiple client devices. Additional details regarding these and other computing devices are provided below in connection with FIG. 8. In addition, FIG. 8 also provides additional details regarding networks, such as the network 140 shown.

As mentioned, the graph updating system 106 performs various functions with respect to dynamically and automatically updating shared knowledge graphs. To briefly summarize, various user identifiers create user-specific knowledge graphs and provide corresponding relationship tables. In response, the graph updating system updates a shared relationship table by adding edge connections from the provided relationship tables. For each added edge connection, the graph updating system determines a new or updated confidence value. Then, based on the confidence value of an edge connection, the graph updating system determines whether to include, display, remove, or hide the edge connection from a corresponding shared knowledge graph. The graph updating system also provides additional functions, as further described below.

As illustrated in FIG. 1, the server device 102 includes a knowledge graph system 104. In some instances, the server device 102 includes additional components not shown. The knowledge graph system 104 can perform a variety of functions. For example, in one or more implementations, the knowledge graph system 104 facilitates creation, modification, management, and distribution of various knowledge graphs across the network 140. For instance, the knowledge graph system 104 receives knowledge graphs from client devices and provides shared knowledge graphs to client devices. Additionally, among some implementations, the knowledge graph system 104 stores or otherwise maintains knowledge graphs in various data structures (e.g., in databases, tables, lists, or documents).

As shown, the knowledge graph system 104 includes the graph updating system 106. As also shown, the graph updating system 106 includes various components and elements. For example, the graph updating system 106 includes an edge connection manager 110, a relationship extraction manager 112, an edge confidence value manager 114, a graph presentation manager 116, and a storage manager 118. As also shown, the storage manager 118 includes edge connections 120, edge relationship tables 122, a relationship extraction model 124, an edge connection confidence value model 126, and digital documents 128.

In various implementations, the components and elements of the graph updating system 106 facilitate the actions described in this document with respect to the graph updating system 106. As non-limiting examples, the edge connection manager 110 manages edge connections 120, including nodes and their relationships. For instance, the edge connection manager 110 connects edge connections 120 from edge relationship tables 122 to knowledge graphs. In some implementations, the relationship extraction manager 112 extracts edge connections 120 from digital documents 128 and writes them to input edge relationship tables 122, as further provided below. In various instances, the relationship extraction manager 112 utilizes a relationship extraction model 124, which may be a type of machine-learning model.

As other examples, the edge confidence value manager 114 determines confidence values for edge connections 120 within one or more types of edge relationship tables 122. For example, the edge confidence value manager 114 utilizes an edge connection confidence value model 126 (e.g., a confidence value machine-learning model or confidence value neural network) to determine confidence values for edge connections 120 based on multiple factors corresponding to each edge connection. Additionally, the graph presentation manager 116 displays the knowledge graphs and/or relationship tables to client devices within graphical user interfaces. In some implementations, the graph presentation manager 116 applies visual effects to emphasize user identifiers, data sources, and/or other data attributes corresponding to edge connections 120 in a knowledge graph.

Returning to FIG. 1, the environment 100 includes the client device 130 having a client application 132. Among various implementations, the client device 130 is a user client device associated with an individual user or entity user. In various implementations, the client application 132 is provided by and/or communicates with the graph updating system 106 to facilitate device and user interactions with the graph updating system 106. For example, the graph updating system 106 allows some or all of the graph updating system 106 to function via the client application 132, which may be a mobile application, browser application, and/or system application.

Although FIG. 1 illustrates a particular number, type, and arrangement of components within the environment 100, various additional environment configurations and arrangements are possible. For example, the environment 100 includes additional client devices and/or computing devices. As another example, the server device 102 is a cluster of server devices. Additionally, as mentioned above, the graph updating system 106 is implemented on both the server device 102 and the client device 130, or that the server device 102 and the client device 130 each implements an instance or version of the graph updating system 106.

Figure 2A:
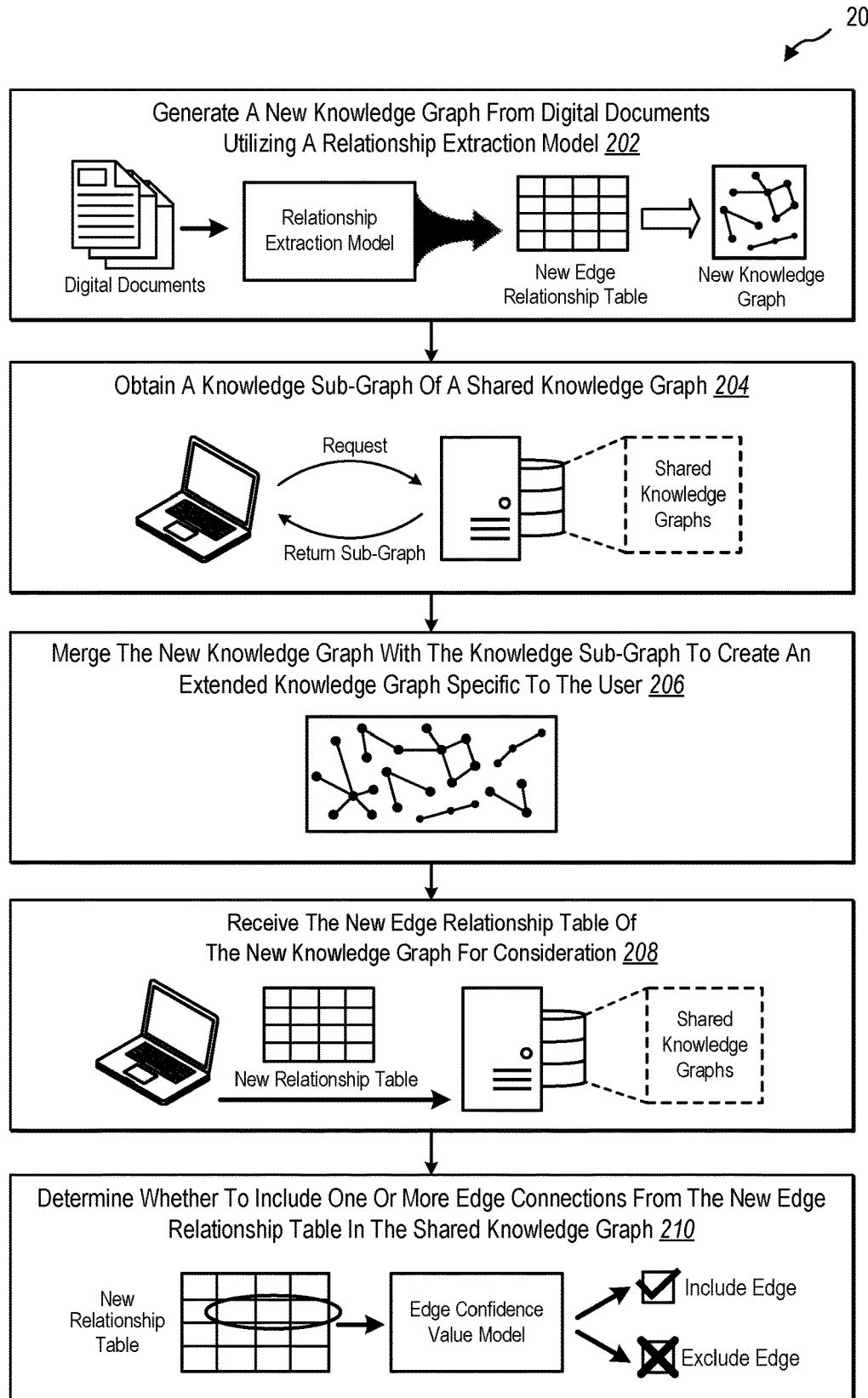
FIGS. 2A-2B illustrate an example overview for accurately and automatically updating a shared knowledge graph with newly discovered and credible information in accordance with one or more implementations.
Figure 2B:
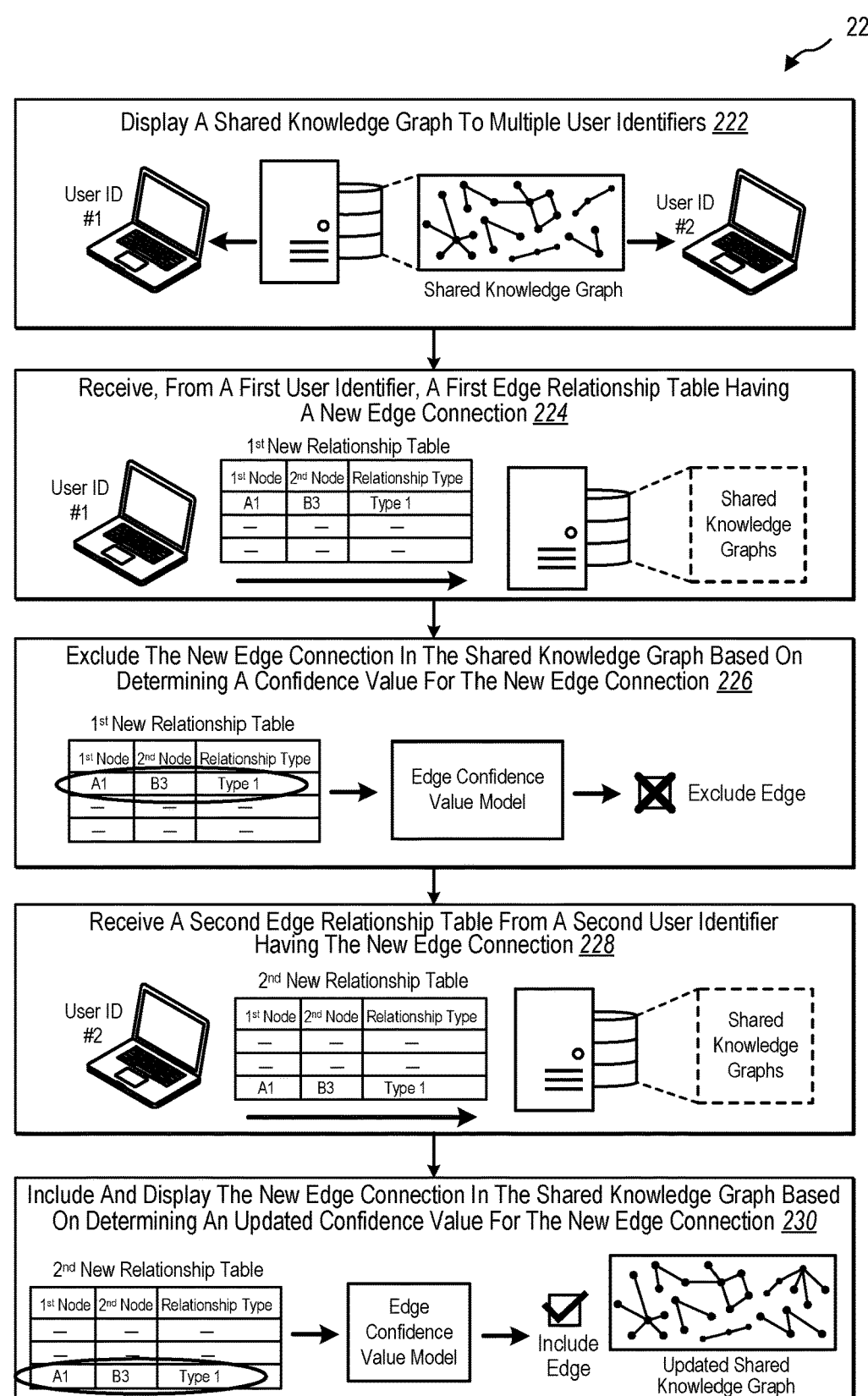

Additional details in connection with an example implementation of the graph updating system 106 are discussed in connection with FIGS. 2A-2B. For example, FIGS. 2A-2B illustrate an example overview for accurately and automatically updating a shared knowledge graph with newly discovered and credible information in accordance with one or more implementations. In particular, FIG. 2A shows generating edge connections in a user-specific new knowledge graph and determining whether to include these edge connections in a shared knowledge graph. FIG. 2B shows including and displaying new edge connections in a shared knowledge graph based on corresponding updated confidence values. For ease of explanation, while FIG. 2A includes a first series of acts 200 and FIG. 2B includes a second series of acts 220, and the graph updating system 106 may perform each of the acts described.

As shown in FIG. 2A, the first series of acts 200 includes an act 202 of generating a new knowledge graph from digital documents utilizing a relationship extraction model. For example, a user selects one or more digital documents to be provided to a relationship extraction model. The graph updating system 106 utilizes a relationship extraction model to generate a new edge relationship table of edge connections identified in the digital documents. Additionally, the graph updating system 106 generates a new knowledge graph from the new edge relationship table. For instance, the new knowledge graph includes a visual representation of the connections extracted from the digital documents. Additional details regarding extracting edge connections from digital documents are provided below in connection with FIG. 3A.

As shown in FIG. 2A, the first series of acts 200 includes an act 204 of obtaining a knowledge sub-graph of a shared knowledge graph. For example, the graph updating system 106 receives at a server device, which maintains or manages the shared knowledge graph, a request from a client device for a knowledge sub-graph (or simply sub-graph) corresponding to a specific shared knowledge graph and topic. In response, the graph updating system 106 generates the requested sub-graph at the server device and provides it to the client device. Additional details regarding knowledge sub-graphs are provided below in connection with FIG. 3B.

FIG. 2A also shows that the first series of acts 200 includes an act 206 of merging the new graph with the knowledge subgraph of a shared knowledge graph to create an extended knowledge graph specific to the user. For example, the graph updating system 106 combines the received shared knowledge graph with the new knowledge graph, which is newly created from the digital documents, to show visualized correlations of the digital documents with a shared knowledge graph. Additional details regarding generating an extended knowledge graph are provided below in connection with FIG. 3B.

As shown in FIG. 2A, the first series of acts 200 includes an act 208 of receiving the new edge relationship table of the new knowledge graph for consideration. For example, the graph updating system 106 on the server device receives the new edge relationship table from the client device associated with the user identifier of the user. In various implementations, the graph updating system 106 receives new edge relationship tables from multiple client devices associated with multiple user identifiers. In response to receiving a new knowledge graph, the graph updating system 106 considers whether one or more of the edge connections in the new knowledge graph should be added to a shared knowledge graph and/or included in a shared knowledge graph. Additional details regarding receiving edge relationship tables are provided below in connection with FIG. 3A.

Additionally, FIG. 2A shows that the first series of acts 200 includes an act 210 of determining whether to include one or more edge connections from the new edge relationship table in the shared knowledge graph. In various implementations, the graph updating system 106 examines edge connections with the received edge connections in the new edge relationship table to determine corresponding confidence values. In one or more implementations, the graph updating system 106 utilizes an edge confidence value model to generate and/or update confidence values for edge connections, which the graph updating system 106 utilizes to determine whether to include edge connections in a shared knowledge graph. Additional details regarding generating confidence values for edge connections and determining whether to include edge connections in a shared knowledge graph are provided below in connection with FIG. 3B.

As mentioned above, FIG. 2B corresponds to including and displaying new edge connections in a shared knowledge graph in response to updating confidence values. FIG. 2B also shows a second series of acts 220. To illustrate, the second series of acts 220 includes in act 222 of displaying a shared knowledge graph to multiple user identifiers. For example, the graph updating system 106 on the server device that maintains a shared knowledge graph provides a shared knowledge graph to multiple user identifiers associated with multiple corresponding client devices. For example, the two client devices display the same or different portions of a shared knowledge graph.

In addition, the second series of acts 220 includes an act 224 of receiving, from a first user identifier, a first edge relationship table having a new edge connection. For example, the graph updating system 106 receives a new knowledge graph from the client device mentioned above with respect to FIG. 2A. Alternatively, the graph updating system 106 receives a new knowledge graph from another client device from another user identifier. As mentioned previously, the graph updating system 106 can identify edge connections within the edge relationship table to be added to a shared relationship table either as a new entry or as part of an existing entry. Additional details regarding adding edge connections to a shared relationship table are provided below in connection with FIG. 4A.

As shown, the second series of acts 220 includes an act 226 of excluding the new edge connection in the shared graph based on determining a confidence value for the new edge connection. For example, the graph updating system 106 utilizes an edge confidence value model to determine a confidence value for the new edge connection based on a number of attributes, characteristics, and/or factors of the edge connection. If the confidence value for the edge connection is below an edge displaying threshold, the graph updating system 106 determines not to include the new edge connection in a shared network graph. Additional details regarding determining confidence values for edge connections are provided below in connection with FIG. 4A.

Additionally, FIG. 2B shows that the second series of acts 220 includes an act 228 of receiving a second edge relationship table from a second user identifier having the new edge connection. For example, the graph updating system 106 receives a second instance of the same new edge connection (e.g., the same node pair with the same relationship type) from a separate user identifier associated with a separate client device. For instance, the second user identifier extracts the new edge connection from a separate set of digital documents. In response, the graph updating system 106 supplements the shared relationship table based on receiving another instance of the edge connection. As noted above, details of this act are provided with respect to FIG. 4A below.

Further, as shown, the second series of acts 220 includes an act 230 of including and displaying the new edge connection in the shared knowledge graph based on determining an updated competence value for the new edge connection. For example, each time the new edge connection is updated within the shared relationship table, the graph updating system 106 updates its confidence value, as the attributes, characteristics, and/or factors for the new edge connection have changed. For instance, additional instances of the new edge connection often increase the confidence value of the edge connection. In various implementations, when the confidence value satisfies the edge displaying threshold, the graph updating system 106 determines to include the new edge connection in the shared relationship table and/or display the new edge connection within the shared knowledge graph. Similarly, as the confidence value of an edge connection decreases, the graph updating system 106 may determine to remove and/or hide the edge connection from the shared knowledge graph. Additional details regarding including or excluding edge connections from a shared knowledge graph are provided below in connection with FIG. 4A.

Figure 3A:
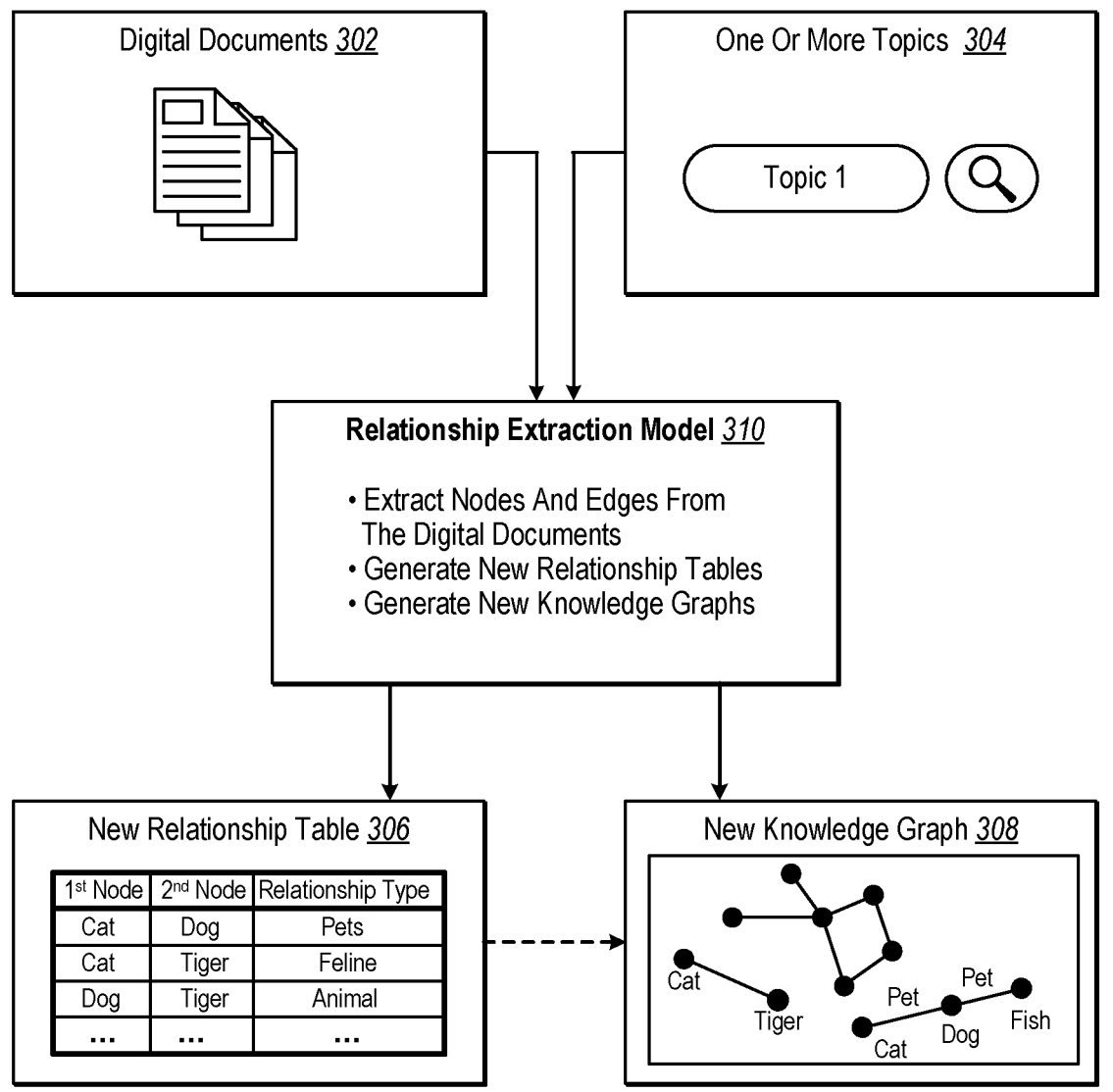
FIGS. 3A-3B illustrate example diagrams for utilizing a relationship extraction model for generating and exploring new and extended knowledge graphs in accordance with one or more implementations.
Figure 3B:
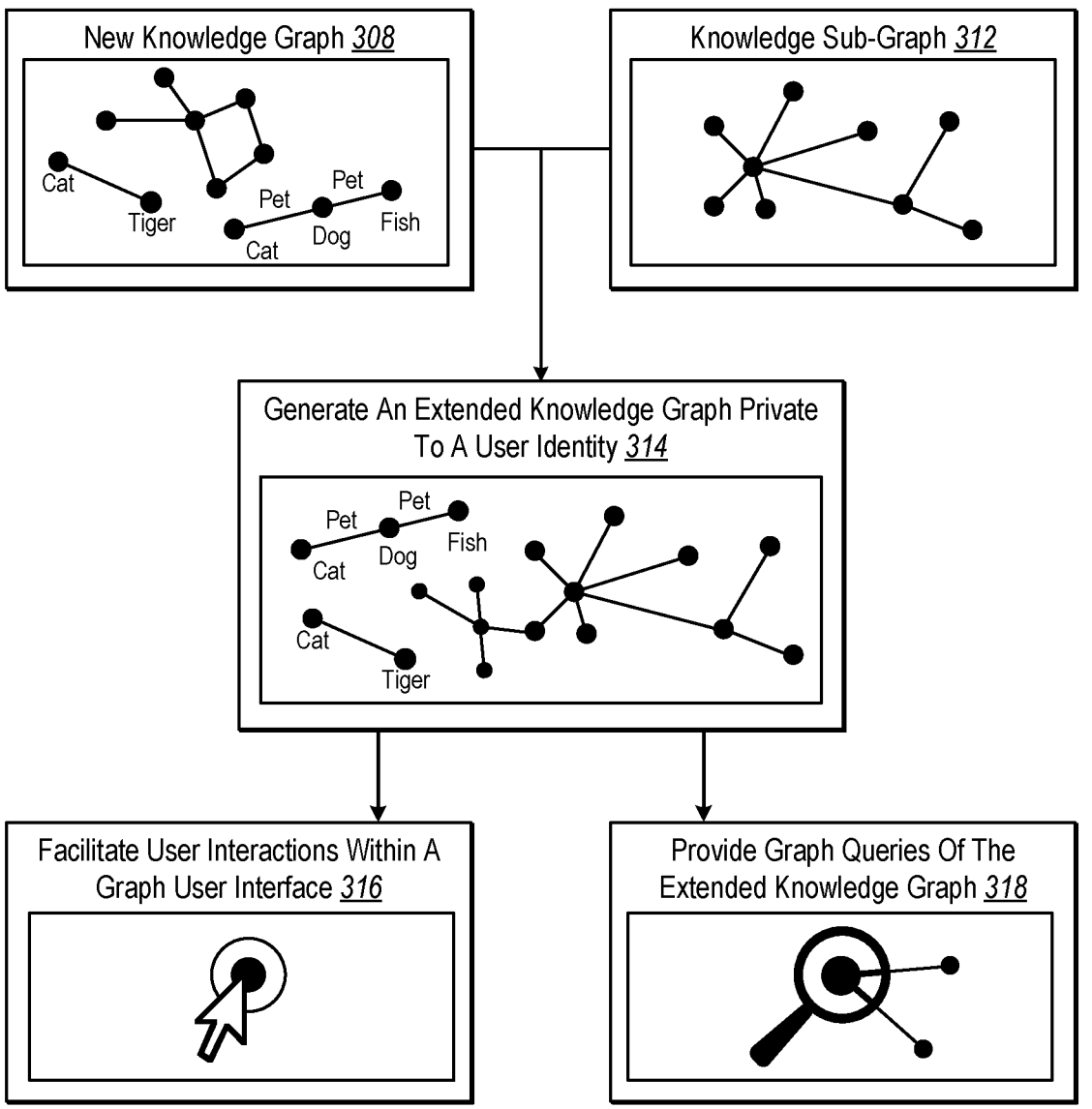

As mentioned above, FIGS. 3A-3B provide additional detail regarding operations of the graph updating system 106 with respect to generating new edge connections, relationship tables, and new knowledge graphs. In particular, FIGS. 3A-3B illustrate example diagrams for utilizing a relationship extraction model for generating and exploring new and extended knowledge graphs in accordance with one or more implementations. As shown, FIG. 3A includes generating a new knowledge graph from digital documents. Additionally, FIG. 3B includes generating and utilizing extended knowledge graphs from the new knowledge graph and a knowledge sub-graph.

To elaborate, FIG. 3A includes digital documents 302. For example, the graph updating system 106 identifies a set of digital documents that include a given topic. For example, the graph updating system 106 or another system provides an interface for selecting one or more digital documents to be analyzed for topics and relationships. In some implementations, the interface is a graphical user interface. In alternative implementations, the interface is text-based.

As mentioned above, in various implementations, the graph updating system 106 provides an interface that allows a user to select one or more of the digital documents 302, such as documents that include text and/or graphics. In some implementations, the graph updating system 106 automatically identifies digital documents. For example, based on receiving a topic, the graph updating system 106 (or another system) identifies one or more of the digital documents 302 from a corpus of digital documents. For instance, the graph updating system 106 selects the digital documents 302 that correspond to a given topic and that satisfy one or more additional conditions (e.g., recency, length, author, sources). In other instances, any time a digital document that corresponds to a given topic is added to a corpus or collection of digital documents, graph updating system 106 selects the digital document.

As also shown, FIG. 3A also includes one or more topics 304. For instance, the graph updating system 106 receives one or more topics 304 to extract. According to some implementations, the received topics correspond to topics to be identified within the digital documents, as provided below. In some implementations, the graph updating system 106 receives a topic or multiple topics from a user via an interface. For example, the user interface is the same interface provided for identifying the one or more of the digital documents 302. In various implementations, the topic is included on a list of topics and/or previously provided by a user associated with a user identity.

FIG. 3A also includes a relationship extraction model 310. In various implementations, the relationship extraction model 310 identifies, determines, and extracts relationships between concepts from digital content, such as the digital documents 302. For example, upon providing the relationship extraction model 310 with one or more digital documents, the relationship extraction model 310 outputs pairs of concepts (e.g., nodes) along with at least one relationship (e.g., edge) between the pair.

As mentioned, in many implementations, the graph updating system 106 utilizes the relationship extraction model 310 to extract relationship pairings from digital documents. In various implementations, the relationship extraction model 310 is a deep-learning and/or machine-learning model trained to identify, extract, and output relationships between concept pairs. In some implementations, the relationship extraction model 310 is another type of model that utilizes rules or heuristics to generate relationship pairs.

In various implementations, the graph updating system 106 provides the selected set of one or more digital of the documents 302 to the relationship extraction model 310. In additional implementations, the graph updating system 106 also provides the one or more topics 304 to the relationship extraction model 310. In response, the relationship extraction model 310 extracts relationship pairs from the set of digital documents that correspond to the given topics.

In various implementations, the graph updating system 106 generates or trains the relationship extraction model 310. In some implementations, the graph updating system 106 obtains the relationship extraction model 310 from another source. In these implementations, the graph updating system 106 can further tune the relationship extraction model 310 to generate a new relationship table and/or a new knowledge graph to indicate extracted relationship pairs.

The relationship extraction model 310 can provide various types of outputs to indicate relationship pairs. For example, the relationship extraction model 310 provides a new relationship table 306 (or an edge list). As shown in FIG. 3A, the new relationship table 306 includes entries (e.g., rows) that have a first node (e.g., a first concept), a second node (e.g., a second concept), and a relationship type (e.g., an edge type). In some implementations, the new relationship table 306 includes additional pieces of information, attributes, or characteristics, such as a relationship strength or quality metric, a number of times the relationship occurs, a relationship frequency metric, and/or other information.

As shown, the relationship extraction model 310 also generates a new knowledge graph 308. In various implementations, the new knowledge graph corresponds to the new relationship table 306. For example, the new knowledge graph is a visual representation of the new relationship table 306 generated by the relationship extraction model 310 and includes nodes for the concepts and edges for the relationship types. In this manner, the relationship extraction model 310 can generate an on-the-fly new knowledge graph that visually identifies relationships from a set of digital documents.

Moving on to FIG. 3B, which corresponds to generating and utilizing extended knowledge graphs from the new knowledge graph and a knowledge sub-graph. As shown, FIG. 3B includes the new knowledge graph 308. In addition, FIG. 3B also includes a knowledge sub-graph 312. The knowledge sub-graph 312 is often a smaller portion of a shared knowledge graph.

In various implementations, the graph updating system 106 obtains the knowledge sub-graph 312 based on querying a shared knowledge graph with one or more topics, subjects, concepts, or relationships. For example, the graph updating system 106 traverses a shared knowledge graph to identify nodes and their edges that correspond to the query. The graph updating system 106 then generates the knowledge sub-graph 312 from the identified nodes. In some instances, the graph updating system 106 also includes additional surrounding nodes. For instance, a user preference may indicate the number of surrounding nodes to include around identified nodes when generating knowledge graphs. In some instances, the knowledge sub-graph 312 has been previously generated.

As shown, FIG. 3B includes an extended knowledge graph 314. For instance, the graph updating system 106 generates an extended knowledge graph 314 specific to a user identity. For example, the graph updating system 106 generates the extended knowledge graph 314 based on combining the new knowledge graph 308 and the knowledge sub-graph 312 into a single knowledge graph. In various implementations, the graph updating system 106 generates an updated or new relationship table that includes entries from the new knowledge graph and the knowledge sub-graph, then generates the extended knowledge graph 314 from the new or updated relationship table.

In various implementations, the extended knowledge graph 314 utilizes the same symbols for nodes and edges in both knowledge graphs within the extended knowledge graph. Additionally, in one or more implementations, the graph updating system 106 includes different visual effects to better display similarities and differences between the new knowledge graph and knowledge sub-graph. For example, the graph updating system 106 displays the new knowledge graph in a different color or pattern than the knowledge sub-graph. In some implementations, the graph updating system 106 provides a key or legend to indicate the differences.

As mentioned, the extended knowledge graph is specific to a user identifier. In many instances, this means that the extended knowledge graph 314 is provided to a user identifier or a limited group of user identifiers. However, the extended knowledge graph 314 is not provided (or not yet provided) to the group of user identifiers that have access to the shared knowledge graph (but rather a much smaller group). Indeed, the extended knowledge graph 314 allows a user identifier to visualize how the new knowledge graph fits within and relates to the shared knowledge graph without modifying the shared knowledge graph for all user identifiers that access the shared knowledge graph.

In addition, FIG. 3B shows an act 316 of facilitating user interactions within a graph user interface. In various implementations, the graph updating system 106 provides a graphical user interface that allows for user interactions with the extended knowledge graph 314. For example, the graph user interface provides tools and functions for adding, removing, and modifying nodes and relationships from the extended knowledge graph 314. Additionally, the graph user interface allows for viewing the extended knowledge graph 314 from different perspectives and angles.

In some implementations, the graph updating system 106 prompts or otherwise accepts feedback from the user identifier with respect to the extended knowledge graph 314. For example, the graph updating system 106 prompts a user identifier regarding whether a particular relationship between a given pair of nodes is correct or incorrect. Additionally, the graph updating system 106 provides tools for a user identifier to provide feedback regarding nodes and edges.

FIG. 3B also shows an act 318 of providing graph queries of the extended knowledge graph. In one or more implementations, the graph updating system 106 allows for searches and queries of the extended knowledge graph. For example, with the extended knowledge graph that combines the new knowledge graph 308 and the knowledge sub-graph 312 into a single graph, a user identifier can identify new information by querying the newly formed knowledge graph. Indeed, the graph updating system 106 facilities a user identifier to discover new connections and relationships from the extended knowledge graph 314.

Figure 4A:
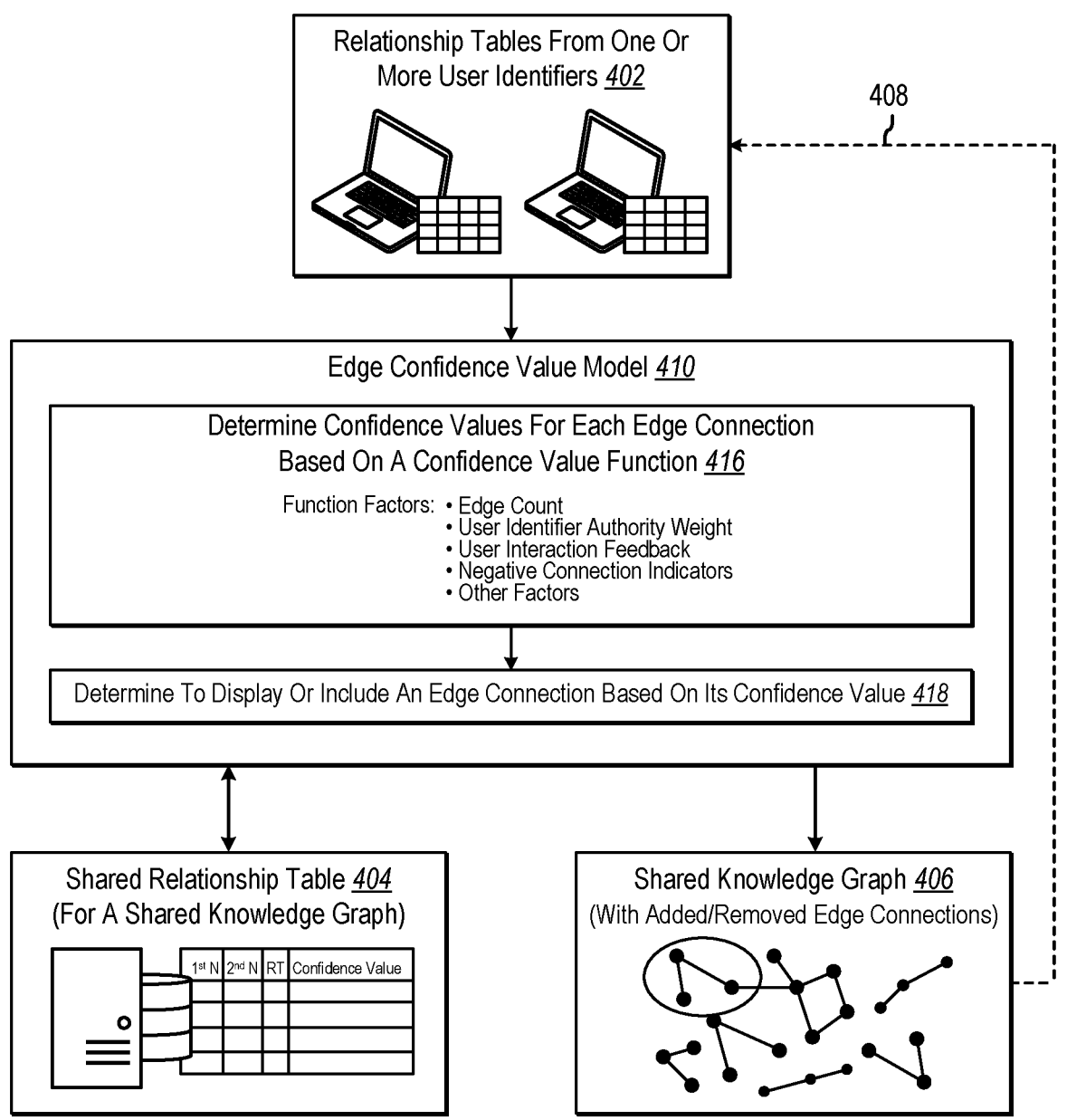

Turning now to FIGS. 4A-4B, additional details are provided regarding adding edge connections to a shared relationship table and determining confidence values for edge connections, as mentioned above. In particular, FIGS. 4A-4B illustrate example diagrams for utilizing an edge confidence value model to update shared knowledge graphs in accordance with one or more implementations As shown, FIG. 4A includes various acts, an edge confidence value model 410, a shared relationship table 404 and a shared knowledge graph 406. FIG. 4B includes an example dynamic shared relationship table 420.

As mentioned, FIG. 4A includes an act 402 of receiving relationship tables from one or more user identifiers. For example, the graph updating system 106 receives one or more new relationship tables from one or more user identifiers associated with a shared knowledge graph. For instance, the graph updating system 106 receives a new knowledge graph having new edge connections to be added to one or more given shared knowledge graphs. In various implementations, each time a user interface utilizes the graph updating system 106 to generate a new knowledge graph from digital documents, the graph updating system 106 receives and stores a copy of the corresponding new relationship table.

In some implementations, the graph updating system 106 maintains separate copies of each new relationship table. In one or more implementations, the graph updating system 106 merges or combines the received new relationship tables into a combined new relationship table. As one example, the graph updating system 106 copies the entries from each received new knowledge graph into a combined new relationship table. In another example, the graph updating system 106 adds the entries to a shared relationship table along with additional information (e.g., a low confidence value), as provided below.

Over time, the graph updating system 106 begins to receive and/or collect several new relationship tables from various user identifiers. Additionally, the graph updating system 106 begins to identify the same edge connections from different received relationship tables. Thus, as multiple instances of a new edge connection surface, and in particular from different user identifiers, the graph updating system 106 determines whether the new edge connection should be added to the corresponding shared knowledge graph.

As shown in FIG. 4A, the graph updating system 106 provides the new relationship tables to the edge confidence value model 410. For instance, the graph updating system

106 detects when a new edge connection from a new relationship table is received, added to a combined new relationship table, and/or updated in a shared relationship table. For example, the edge confidence value model 410 accesses a shared relationship table 404 that corresponds to a shared knowledge graph, which includes the newly added new edge connections from the new relationship tables as well as existing edge connections.

To further illustrate, briefly consider FIG. 4B, which shows a dynamic shared relationship table 420 that corresponds to a shared knowledge graph. As shown in FIG. 4B, the dynamic shared relationship table 420 includes rows and columns where each row corresponds to an edge connection. The columns identify the nodes in an edge connection (e.g., 1st Node and 2nd Node) and the edge connection (e.g., Relationship Type). The columns also include attributes and characteristics of an edge connection (e.g., Edge Interaction Count, ID Authority, Feedback, Negative Link?). These attributes and characteristics are only examples and the dynamic shared relationship table 420 can include additional and/or different attributes and characteristics. Additionally, the columns also include an edge connection confidence value (e.g., Confidence Value) and whether to display the edge connection (e.g., Display?).

The dynamic shared relationship table 420 is dynamic because the graph updating system 106 updates it on-the-fly as edge connection entries are added, updated, and removed. Thus, rather than updating a relationship table every 1-2 years, as do many existing computer systems, the graph updating system 106 updates the dynamic shared relationship table 420 in a reliable and accurate manner as new information arrives.

Regarding the attributes and characteristics, in various implementations, the graph updating system 106 maintains pieces of information for each edge connection that can be used to determine the confidence value for the edge connection, as provided below. For example, the edge interaction count attribute indicates a number of times a given edge interaction count appeared as a new edge connection in a new relationship table (which can include negative counts for negative entries in a new relationship type to remove the edge connection). As another example, the ID Authority attribute indicates an authority score or reputation score for the user identifiers that have provided the edge connection. For example, a larger, peer-reviewed, reliable, and/or trusted source would produce a higher ID Authority metric (e.g., authority score).

As an additional example, the feedback attribute indicates a value indicating feedback of the edge connection with one or more user identifiers. For instance, if a majority of user identifiers provide positive feedback on an edge connection (e.g., within a graph user interface that shows a new knowledge graph, as described above). In another instance, if user identifiers indicate negative feedback with respect to an edge connection, the dynamic shared relationship table 420 indicates such.

Additionally, the dynamic shared relationship table 420 shows a current confidence value, which the graph updating system 106 determines based, at least in part, on the attributes and characteristics of the edge connection. This is described shortly below. As shown, the confidence value is a percentage between 0-100% or a point range between 0.0-1.0 or 1-100. In other implementations, the confidence value is represented by a different metric or scale Further, in various instances, based on the confidence value, the graph updating system 106 determines whether to include or display (e.g., Display?) an edge connection within a shared knowledge graph. For example, in some implementations, if the confidence value is above an edge displaying threshold (e.g., 70%), the graph updating system 106 displays the edge connection (e.g., the first and second edge connection). In one or more implementations, if the confidence value is below the edge displaying threshold, the graph updating system 106 does not display the edge connection (e.g., the third edge connection). In various instances, if the confidence value is below an edge removing threshold (e.g., 5%), the graph updating system 106 determines to remove the edge connection from the shared relationship table 404 (e.g., the fourth edge connection). In some instances, the graph updating system 106 does not remove a new connection unless the edge interaction count meets a minimum edge interaction count threshold (e.g., a low confidence value with at least 3 edge interaction counts).

Notably, while the dynamic shared relationship table 420 provides one example implementation, other implementations are possible. For example, the graph updating system 106 utilizes includes edge connections in a shared relationship table that are displayed in a corresponding shared knowledge graph and includes other edge connections in a separate combined new relationship table, or the graph updating system 106 partitions the dynamic shared relationship table 420 into multiple portions or sections based on confidence value. Indeed, the dynamic shared relationship table 420 merely provides an example implementation and other implementations are possible.

Returning to FIG. 4A and the edge confidence value model 410, in general, the edge confidence value model 410 assists the graph updating system 106 in determining when to display new edge connections in a shared knowledge graph. For example, the graph updating system 106 utilizes the edge confidence value model 410 to determine an edge confidence value (or simply confidence value) for edge connections. Then, based on the confidence value, the graph updating system 106 determines whether to include or display the edge connection in a shared knowledge graph.

To illustrate, the edge confidence value model 410 includes multiple acts. For example, the edge confidence value model 410 includes a first act 416 of determining confidence values for each edge connection based on a confidence value function. In various implementations, the confidence value function includes one or more function factors. Examples of function factors are described below.

An example of a function factor of the confidence value function is edge interaction count. In some implementations, the graph updating system 106 determines the edge interaction count for an edge connection. Each time the same edge connection is identified in a new relationship table, it is added to the shared relationship table 404 and its edge interaction count is incremented. In some instances, when a new relationship table includes the same edge connection multiple times (e.g., the connection was identified numerous times in the set of digital documents), the edge interaction count in the shared relationship table 404 is incremented multiple times.

In one or more implementations, the graph updating system 106 determines the confidence value, or a part of it, based on the edge interaction count. As one example, for each instance of an edge interaction count, the graph updating system 106 adds x confidence value points. As another example, in some implementations, if the edge interaction count satisfies a first edge interaction count threshold, the graph updating system 106 determines a first confidence value. In various implementations, the confidence values are normalized. For example, the graph updating system 106 normalizes confidence values based on the size of the graph, the number of user identifiers, the number of interacted edges, and/or received feedback.

Additionally, in one or more implementations, if the edge interaction count satisfies a second edge interaction count threshold, the graph updating system 106 determines a second confidence value. In various implementations, the graph updating system 106 maps different edge interaction count ranges to different confidence values. In these instances, it is feasible that an edge connection satisfies the maximum edge interaction count threshold and is assigned a sufficiently high confidence value to be displayed. In some cases, the choice of the threshold depends on a number of factors, especially the fidelity of the graph requested by the user. Additionally, the threshold may dynamically change based on the size of the graph.

Another example of a function factor of the confidence value function is user identifier authority weight (e.g., ID Authority). As mentioned above, when a new relationship table is provided, the graph updating system 106 identifies the user identifier from which the new relationship table is received. In various implementations, the graph updating system 106 has generated an ID authority score, metric, or value for the user identifier providing the new relationship table. Additionally, the graph updating system 106 can combine (e.g., sum, average, multiple, etc.) ID authority score from multiple user identifiers as multiple copies of the same edge connection are received from different user identifiers. Then, based on the ID authority value, the graph updating system 106 can determine a confidence value for an edge connection. Additionally, or in the alternative, the graph updating system 106 can weigh other function factors, such as the edge interaction count, when determining the confidence value of an edge connection.

In some implementations, the ID authority weighs the other attributes and characteristics as they are added to the shared relationship table. For example, a single edge interaction count from an unknown user identifier is down-weighted to a 0.5 edge interaction count, a single edge interaction count from a known user identifier is not changed and has a weighted value of 1.0, and a single edge interaction count from a user identifier has a large ID authority score (e.g., a large research lab) is up-weighted to a 3.0 edge interaction count.

An additional example of a function factor of the confidence value function is user interaction feedback. As mentioned above, in some instances, the graph updating system 106 explicitly or implicitly receives feedback regarding edge connections. As this feedback is obtained, the graph updating system 106 associates it with the edge connection. Then, in various implementations, the graph updating system 106 utilizes this feedback in determining the confidence value for the edge connection. For example, for each instance of positive feedback (e.g., an interaction, query, confirmation, or approval), the graph updating system 106 adds x confidence value points, where x is based on the type of positive feedback. Likewise, when feedback is missing or negative, the graph updating system 106 deducts confidence value points. In some implementations, the user interaction feedback weighs the importance of other function factors, such as edge interaction count, based on a user interaction feedback value.

Another example of a function factor of the confidence value function is negative connection indicators. For example, when user interaction manually breaks or removes a connection between two nodes, the graph updating system 106 associates the negative connection indication with the edge connection. This information is passed to the graph updating system 106 and used to determine the confidence value for the edge connection.

While not shown, the edge confidence value model 410 can include additional and/or different function factors. For example, the edge confidence value model 410 incorporates recency, content type, source of the digital document from which an edge connection was extracted, the shared knowledge graph to which the edge connection is to be added, the number of unique user identifiers contributing the edge connection, or diversity among user identifiers. As another example, the edge confidence value model 410 includes whether the corresponding shared knowledge graph is public, private, or semi-private as one of the function factors.

In determining the confidence value for an edge connection, the edge confidence value model 410 can combine one or more function factors in one or more ways to arrive at the confidence value. In various implementations, the edge confidence value model 410 is a rule-based or heuristic model that applies different rules to each function factor to determine confidence values. For example, each function factor operates based on a set of rules that contributes to the overall confidence value of an edge connection. In some cases, some function factors may contribute significantly to the confidence value while other factors contribute less (or at least a minimum amount). In other cases, each of the function factors may each contribute lesser amounts, but the total contributions result in a larger confidence value In some implementations, the edge confidence value model 410 is a machine-learning model or neural network. For example, the edge confidence value model 410 is a confidence value machine-learning model trained based on the attributes and characteristics as inputs to predict the confidence value of an edge connection and/or whether to display or include the edge connection.

As shown, the edge confidence value model 410 includes a second act 418 of determining to include or display an edge connection based on its confidence value. As mentioned above, the graph updating system 106 and/or the edge confidence value model 410 implements an edge displaying threshold to determine when an edge connection should be displayed in a shared knowledge graph. When the confidence value of an edge connection satisfies the edge displaying threshold, the graph updating system 106 displays the edge connection within the shared knowledge graph. Otherwise, the edge connection remains hidden, and in some cases, not included in the shared relationship table that corresponds to displaying the shared knowledge graph.

To illustrate, FIG. 4A includes a shared knowledge graph 406 with added and removed edge connections. For example, new edge connections are shown within the circled area. Indeed, as new relationship tables are received, the graph updating system 106 utilizes the edge confidence value model 410 to dynamically update confidence values for edge connections. Additionally, as shown by the act 408, the graph updating system 106 continuously repeats the acts shown in FIG. 4A of updating the shared relationship table 404 and the shared knowledge graph 406.

In general, new edge connections initially will not have confidence values that satisfy the edge displaying threshold. However, as additional instances of the new same edge connection are received in additional new relationship tables, then, the confidence value for the new edge connection will commonly increase. After some time period (e.g., due to the number of edge interaction counts, the reputability of those submitting the edge connection, user interaction, etc.), the confidence value for the new edge connection will satisfy the edge displaying threshold and the graph updating system 106 will determine to add or display the new edge connection to the shared knowledge graph 406.

As mentioned, the graph updating system 106 determines whether to add or display a new edge connection in the shared knowledge graph 406. In the case of adding a new edge connection, the graph updating system 106 copies the edge connection from a relationship table, such as a combined new relationship table of the dynamic shared relationship table 420 to a shared relationship table (e.g., one without attributes and characteristics for each edge connection) for the shared knowledge graph, where all the edge connections in the shared relationship table are displayed in the shared knowledge graph. In the case of displaying the new edge connection, the graph updating system 106 displays the edge connection from any relationship table that also indicates whether a given edge connection should be displayed. In any case, the end result is displaying the edge connection in the shared knowledge graph when it has a confidence value that justifies being displayed.

As mentioned above, unlike existing computer systems that are updated infrequently, the graph updating system 106 allows for shared knowledge graphs to be updated in real-time, as new relationship tables are identified. Thus, as new digital documents are being published and reviewed, the findings and discoveries of these digital documents can be quickly and accurately added to a corresponding shared knowledge graph to be shared with all user identifiers that have access to the shared knowledge graph (e.g., user identifiers having a user authority score that is above an authority score threshold indicating the user identifier is authorized or reputable). Indeed, the graph updating system 106 only makes automatic and dynamic updates to shared knowledge graphs when enough data supports the conclusion that a new edge connection has a significantly strong confidence value to support its inclusion. Furthermore, by utilizing the edge confidence value model 410, the graph updating system 106 ensures that only accurate, verifiable, and statistically guaranteed edge connections are added to the shared knowledge graphs.

In some implementations, the shared knowledge graph 406 provides additional information for a given edge connection. For example, upon interacting with a given edge connection, the graph updating system 106 indicates its confidence value and/or other user identifiers that contributed to being included in the edge connection within the shared knowledge graph. In some implementations, the shared knowledge graph 406 provides a visual effect to newly added edge connections so that user identifiers can see recent changes to a shared knowledge graph. As another example, the graph updating system 106 allows a user identifier viewing a shared knowledge graph to modify (for themselves) the edge displaying threshold, which shows additional edge connections or hides existing edge connections that do not satisfy the updated edge displaying threshold.

Figure 5:
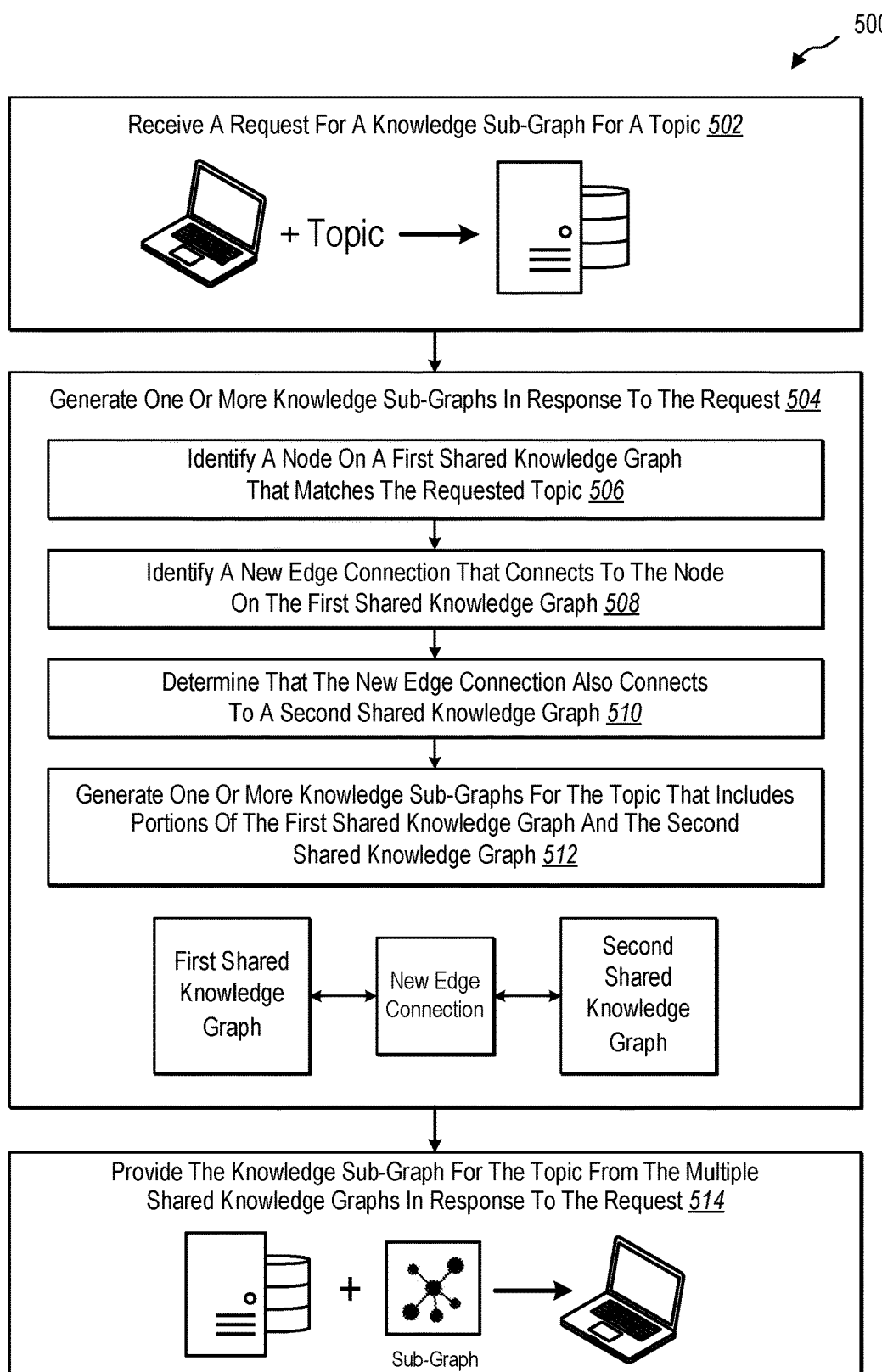
FIG. 5 illustrates an example diagram for expanding research opportunities based on utilizing the graph updating system by linking multiple shared knowledge graphs in accordance with one or more implementations.

Turning now to the next figure, FIG. 5 illustrates an example diagram for expanding research opportunities based on utilizing the graph updating system by linking multiple shared knowledge graphs in accordance with one or more implementations. As shown, FIG. 5 includes a series of acts 500 implemented by the graph updating system 106.

By way of context, knowledge graphs are used by researchers to explore and explain complex fields. In particular, shared knowledge graphs provide groups of researchers the ability to share reliable information on given subjects, such as coronavirus research, drug side effects, protein interactions, reasons for disease, etc. While extensive and growing, these research fields are often isolated from each other. Utilizing the approaches and techniques in this document, the graph updating system 106 accurately and more quickly unlocks new connections between shared knowledge graphs of similar as well as different subject matter. Indeed, the graph updating system 106 facilitates added connections and crossovers between different subject matter-based shared knowledge graphs in response to adding new edge connections to shared knowledge graphs.

To illustrate, the series of acts 500 on FIG. 5 includes an act 502 of receiving a request for a knowledge sub-graph for a topic. As described above, in various implementations, the graph updating system 106 receives a request for a shared knowledge graph with respect to a given topic. In some instances, the request specifies a particular shared knowledge graph. In various instances, the request does not specify a shared knowledge graph or allow for multiple shared knowledge graphs to be considered.

As shown, the series of acts 500 includes an act 504 of generating one or more knowledge sub-graphs in response to the request. As described above, the graph updating system 106 searches one or more shared knowledge graphs for the given topic and generates a knowledge sub-graph to provide back to the requesting device. In some implementations, the graph updating system 106 follows an alternative path to generate a knowledge sub-graph, as shown as sub-acts of the act 504.

To illustrate, the act 504 includes a first sub-act 506 of identifying a node on a first shared knowledge graph that matches the requested topic. Indeed, the graph updating system 106 queries the shared knowledge graph for the topic and identifies a particular node. In addition, the act 504 includes a second sub-act 508 of identifying a new edge connection that connects to the node in the first shared knowledge graph. For example, the graph updating system 106 determines that the identified node connects (directly or indirectly within a specified number of hops) to a recently added new edge connection.

Additionally, the act 504 includes a third sub-act 510 of determining that the new edge connection also connects to a second shared knowledge graph. For example, the graph updating system 106 connects a new edge connection to both the first shared knowledge graph and the second shared knowledge graph utilizing the processes described in this document. In some implementations, the graph updating system 106 determines that the new edge connection is connected to one or more other new edge connections that are connected to the second shared knowledge graph. For instance, the set of new edge connections forms a type of new knowledge graph that connects the first shared knowledge graph to the second shared knowledge graph at particular nodes.

Upon determining the connection between the first shared knowledge graph and the second shared knowledge graph, the graph updating system 106 can treat the two shared knowledge graphs as a single combined graph. For example, the act 504 includes a fourth sub-act 512 of generating one or more knowledge sub-graphs for the topic that includes portions of the first knowledge graph and portions of the second shared knowledge graph, as these portions are connected via the new edge connection. Indeed, the graph updating system 106 generates a knowledge sub-graph by traversing from the identified node in the first shared knowledge graph and traveling to one or more nodes in the second shared graph. The graph updating system 106 can generate multiple knowledge sub-graphs corresponding to the same or different shared knowledge graphs. In this manner, the graph updating system 106 connects two separate shared knowledge graphs, which may correspond to different research fields or subject matters, through one or more newly added edge connections.

FIG. 5 also shows that the series of acts 500 includes an act 514 of providing the knowledge sub-graphs for the topic from the multiple shared knowledge graphs in response to the request. For example, the graph updating system 106 provides the newly generated knowledge sub-graph that spans from the first shared knowledge graph across the new edge connection to the second shared knowledge graph to the requesting device.

While FIG. 5 provides one example of linking two shared knowledge graphs via one or more new edge connections, shared knowledge graphs can be connected in additional ways. For example, new edge connections can link multiple shared knowledge graphs together within a knowledge graph database maintained by the graph updating system 106. For instance, once connected, with one or more edge connections, the graph updating system 106 logically combines the two shared knowledge graphs into a larger shared knowledge graph on the backend (e.g., server device). In this manner, the graph updating system 106 reveals connections that otherwise would remain undiscovered.

Turning now to FIG. 6 and FIG. 7, these figures illustrate example flowcharts that include a series of acts for utilizing the graph updating system 106 in accordance with one or more implementations. While FIG. 6 and FIG. 7 illustrate acts according to one or more implementations, alternative implementations may omit, add to, reorder, and/or modify any of the acts shown. Further, the acts of FIG. 6 and FIG. 7 can each be performed as part of a method. Alternatively, a non-transitory computer-readable medium can include instructions that, when executed by at least one processor, cause a computing device to perform the acts of FIG. 6 and FIG. 7. In still further implementations, a system can perform the acts of FIG. 6 and FIG. 7.

To illustrate, FIG. 6 shows an example series of acts for dynamically and automatically updating a shared knowledge graph in accordance with one or more implementations. As shown, the series of acts 600 includes an act 610 of generating a confidence value for a first edge connection between a first node and a second node in an edge relationship table for a shared knowledge graph. For instance, the act 610 may involve generating, at a server device, a confidence value for a first edge connection between a first node and a second node (or the first node to the second node), where the first edge connection is part of a first edge relationship table that corresponds to displaying a shared knowledge graph having nodes and edges. In one or more implementations, the act 610 includes determining the confidence value for the first edge connection in the first edge relationship table based on an edge interaction count indicating a number of times the first edge connection is included in received relationship tables and, in some cases, weighting the edge interaction count for the first edge connection based on user authority scores of user identifiers that are associated with the received relationship tables.

As further shown, the series of acts 600 includes an act 620 of determining to not display the first edge connection based on the confidence value for the first edge connection. For example, the act 620 may involve determining to not display the first edge connection on the shared knowledge graph based on the confidence value for the first edge connection being below an edge displaying threshold. In one or more implementations, the act 620 includes receiving, at the server device and from a client device associated with the user identifier, a request for a knowledge sub-graph generated or extracted from the shared knowledge graph corresponding to a given node; identifying a portion of edge connections from the first edge relationship table based on the given node; and providing, to the client device associated with the user identifier, the knowledge sub-graph having the portion of edge connections for display.

In various implementations, the act 620 includes causing the client device associated with the user identifier to display an extended knowledge graph within the graphical user interface and detecting (directly or indirectly) user interactions with the first edge connection within the extended knowledge graph. In some implementations, providing the knowledge sub-graph for display causes the client device associated with the user identifier to combine the knowledge sub-graph and the new knowledge graph into an extended knowledge graph. In some implementations, the act 620 includes generating the second edge relationship table by extracting edge connections from a set of digital documents and, in some cases, extracting the edge connections from the set of digital documents utilizing a machine-learning relationship extraction model.

As further shown, the series of acts 600 includes an act 630 of receiving another edge relationship table having another instance of the first edge connection. For example, the act 630 may involve receiving, at the server device, a second edge relationship table from a user identifier (e.g., a user identifier associated with a user authority score), the second edge relationship table having an instance of the first edge connection between the first node and the second node. In various implementations, the second edge relationship table was generated in connection with creating a new knowledge graph to be displayed within a user interface associated with the user identifier. In other words, the server device provided instructions to a client device associated with the user identifier to generate the second edge relationship table and/or the new knowledge graph.

As further shown, the series of acts 600 includes an act 640 of generating an updated confidence value for the first edge connection. For example, the act 640 may involve generating an updated confidence value for the first edge connection within the first edge relationship table in response to receiving the second edge relationship table. In various implementations, the act 640 includes increasing the edge interaction count based on receiving the second edge relationship table to generate an updated edge interaction count and generating the updated confidence value based on the updated edge interaction count. In some implementations, the act 640 includes generating the updated confidence value based on a set of factors including an edge interaction count, a user identifier authority weight, user interaction feedback, and negative connection indicators.

As further shown, the series of acts 600 includes an act 650 of displaying the first edge connection based on the updated confidence value for the first edge connection in the shared knowledge graph. For example, the act 650 may involve providing, for display within a graphical user interface, the shared knowledge graph including the first edge connection based on the updated confidence value for the first edge connection satisfying the edge displaying threshold. In various implementations, the shared knowledge graph is provided to a set of authorized user identifiers having user authority scores above an authority score threshold, the second edge relationship table corresponds to a new knowledge graph associated with the user identifier from the set of authorized user identifiers, and/or other user identifiers in the set of authorized user identifiers do not have access to the new knowledge graph.

The series of acts 600 can include additional acts in various implementations. For example, in one or more implementations, the series of acts 600 includes acts of automatically receiving edge relationship tables from multiple different authorized user identifiers; automatically updating the first edge relationship table based on edge connections included in the edge relationship tables, which modifies confidence values of edge connections within the first edge relationship table; and/or generating an updated display of the shared knowledge graph to display a different combination of nodes and edges based on the confidence values of the edge connections that were modified within the first edge relationship table. In some implementations, the acts also include determining the confidence value for the first edge connection in the first edge relationship table based on an edge interaction count indicating a number of times the first edge connection is included in received relationship tables and a user reputation (e.g., a user authority score) weight applied to the edge interaction count.

To further illustrate, FIG. 7 shows another example series of acts for dynamically and automatically updating a shared knowledge graph in accordance with one or more implementations. As shown, the series of acts 700 includes an act 710 of receiving a first edge relationship table having a first edge connection. For instance, the act 710 may involve receiving a first edge relationship table having a first edge connection for connecting a first node and a second node according to a first edge relationship type.

As further shown, the series of acts 700 includes an act 720 of generating a confidence value for the first edge connection. For example, the act 720 may involve generating a confidence value for the first edge connection based on a first set of attributes of the first edge relationship table.

As further shown, the series of acts 700 includes an act 730 of determining to not include the first edge connection on a shared knowledge graph based on the confidence value. For example, the act 730 may involve determining, based on the confidence value of the first edge connection not satisfying an edge displaying threshold, to not include the first edge connection on a shared knowledge graph.

As further shown, the series of acts 700 includes an act 740 of receiving a second edge relationship table having the first edge connection. For example, the act 740 may involve receiving a second edge relationship table having the first edge connection connecting the first node and the second node according to the first edge relationship type. In various implementations, the first edge relationship table is associated with a first user identifier and the second edge relationship table is associated with a second user identifier that differs from the first user identifier.

As further shown, the series of acts 700 includes an act 750 of generating an updated confidence value for the first edge connection. For example, the act 750 may involve generating an updated confidence value for the first edge connection based on the first set of attributes of the first edge relationship table and a second set of attributes of the second edge relationship table.

As further shown, the series of acts 700 includes an act 760 of displaying the first edge connection in the shared knowledge graph based on the updated confidence value. For example, the act 760 may involve displaying the first edge connection in a shared knowledge graph based on the updated confidence value satisfying the edge displaying threshold.

In various implementations, the series of acts 700 includes additional acts of providing access to the shared knowledge graph on a server device to multiple different authorized user identifiers including the first user identifier and the second user identifier; maintaining, at the server device, a dynamic edge relationship table for displaying the shared knowledge graph; automatically updating the dynamic edge relationship table at the server device based on edge connections included in the dynamic edge relationship table, which causes confidence values of edge connections to be modified within the dynamic edge relationship table; and/or generating updated displays of the shared knowledge graph based on the confidence values of the edge connections that were modified within the dynamic edge relationship table.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network (i.e., computer network) described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the graph updating system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by at least one processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 8:
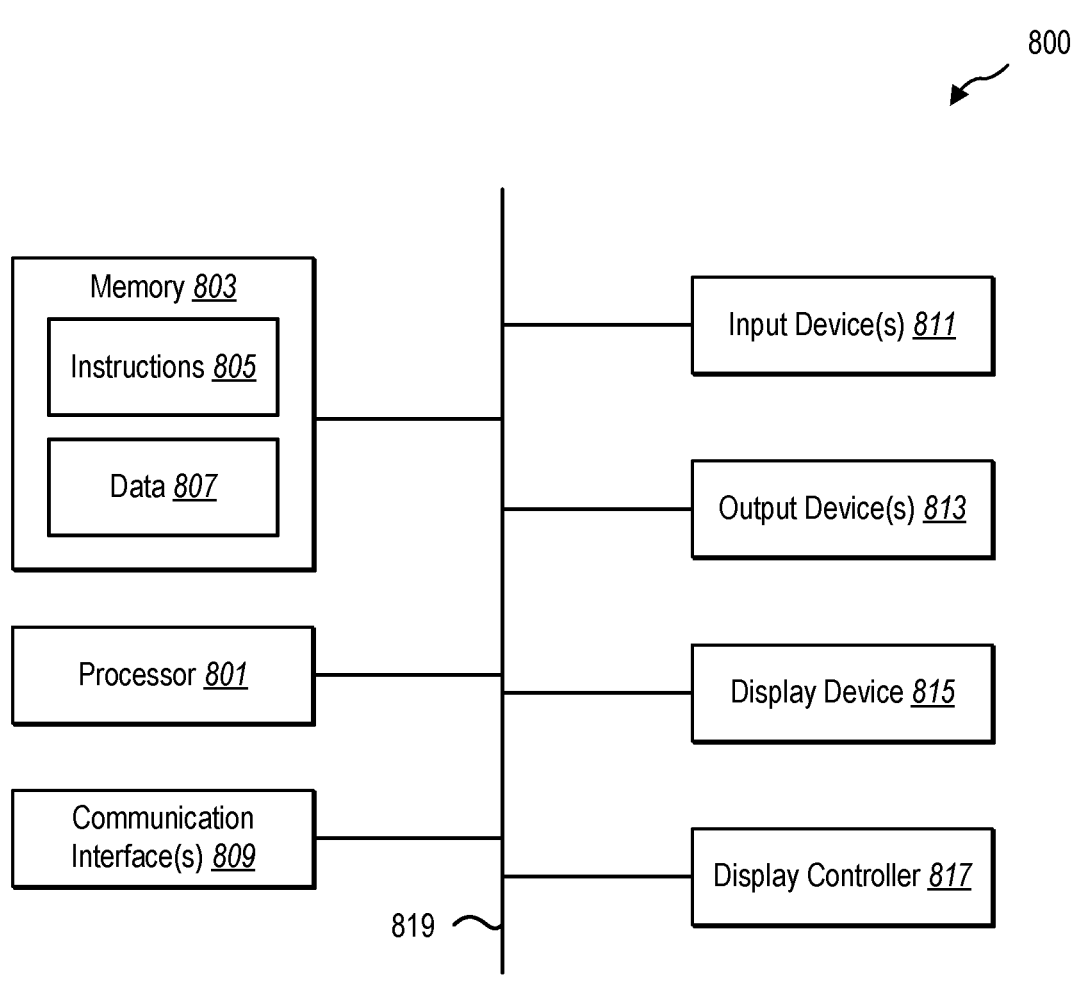
FIG. 8 illustrates certain components that may be included within a computer system.

FIG. 8 illustrates certain components that may be included within a computer system 800. The computer system 800 may be used to implement the various computing devices, components, and systems described herein.

In various implementations, the computer system 800 may represent one or more of the client devices, server devices, or other computing devices described above. For example, the computer system 800 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 800 includes a processor 801 (i.e., at least one processor). The processor 801 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 801 may be referred to as a central processing unit (CPU). Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network (i.e., computer network), both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A computer-implemented method, comprising:

generating, at a server device, a confidence value for a first edge connection between a first node and a second node, wherein the first edge connection is part of a first edge relationship table that corresponds to displaying a shared knowledge graph having nodes and edges, and wherein determining the confidence value for the first edge connection includes weighting an edge interaction count for the first edge connection based on user authority scores of user identifiers;

determining to not display the first edge connection on the shared knowledge graph based on the confidence value for the first edge connection being below an edge displaying threshold;

receiving, at the server device, a second edge relationship table from a user identifier, the second edge relationship table having an instance of the first edge connection between the first node and the second node, wherein the second edge relationship table was generated in connection with creating a new knowledge graph to be displayed within a user interface associated with the user identifier;

in response to receiving the second edge relationship table, generating an updated confidence value for the first edge connection within the first edge relationship table; and providing, for display within a graphical user interface, the shared knowledge graph including the first edge connection based on the updated confidence value for the first edge connection satisfying the edge displaying threshold.

2. The computer-implemented method of claim 1, further comprising determining the confidence value for the first edge connection in the first edge relationship table based on the edge interaction count indicating a number of times the first edge connection is in received relationship tables.

3. The computer-implemented method of claim 2, wherein the user authority scores of user identifiers are associated with the received relationship tables and indicate user identifiers above an authority score threshold.

4. The computer-implemented method of claim 2, wherein generating the updated confidence value for the first edge connection comprises increasing the edge interaction count based on receiving the second edge relationship table to generate an updated edge interaction count.

5. The computer-implemented method of claim 4, wherein generating the updated confidence value for the first edge connection further comprises generating the updated confidence value based on the updated edge interaction count.

6. The computer-implemented method of claim 1, further comprising:

receiving, at the server device and from a client device associated with the user identifier, a request for a knowledge sub-graph generated from the shared knowledge graph corresponding to a given node;

identifying a portion of edge connections from the first edge relationship table based on the given node; and providing, to the client device associated with the user identifier, the knowledge sub-graph having the portion of edge connections for display.

7. The computer-implemented method of claim 6, further comprising:

causing the client device associated with the user identifier to display an extended knowledge graph within the graphical user interface; and detecting user interactions with the first edge connection within the extended knowledge graph.

8. The computer-implemented method of claim 6, wherein providing the knowledge sub-graph for display causes the client device associated with the user identifier to combine the knowledge sub-graph and the new knowledge graph into an extended knowledge graph.

9. The computer-implemented method of claim 6, further comprising generating the second edge relationship table by extracting edge connections from a set of digital documents.

10. The computer-implemented method of claim 9, further comprising extracting the edge connections from the set of digital documents utilizing a machine-learning relationship extraction model.

11. The computer-implemented method of claim 1, wherein:

the shared knowledge graph is provided to a set of authorized user identifiers having user authority scores above an authority score threshold;

the second edge relationship table corresponds to a new knowledge graph associated with the user identifier from the set of authorized user identifiers; and other user identifiers in the set of authorized user identifiers do not have access to the new knowledge graph.

12. A system comprising:

at least one processor at a server device; and a computer memory comprising instructions that, when executed by the at least one processor at the server device, cause the system to carry out operations comprising:

generating a confidence value for a first edge connection between a first node and a second node, wherein the first edge connection is part of a first edge relationship table that corresponds to displaying a shared knowledge graph having nodes and edges, and wherein generating the confidence value for the first edge connection includes weighting an edge interaction count for the first edge connection based on user authority scores of user identifiers;

determining to not display the first edge connection on the shared knowledge graph based on the confidence value for the first edge connection being below an edge displaying threshold;

receiving a second edge relationship table from a client device associated with a user identifier, the second edge relationship table having an instance of the first edge connection between the first node and the second node, wherein the second edge relationship table was generated in connection with creating a new knowledge graph to be displayed within a user interface associated with the user identifier;

in response to receiving the second edge relationship table, generating an updated confidence value for the first edge connection within the first edge relationship table; and providing, to the client device associated with the user identifier, the shared knowledge graph, wherein the shared knowledge graph is updated to the first edge connection based on the updated confidence value for the first edge connection satisfying the edge displaying threshold.

13. The system of claim 12, wherein generating the updated confidence value for the first edge connection within the first edge relationship table is based on a set of factors including an edge interaction count, a user identifier authority weight, user interaction feedback, and negative connection indicators.

14. The system of claim 13, wherein generating the updated confidence value for the first edge connection comprises:

increasing the edge interaction count based on receiving the second edge relationship table to generate an updated edge interaction count; and generating the updated confidence value based on the updated edge interaction count.

15. The system of claim 12, further comprising instructions that, when executed by the at least one processor, cause the system to carry out operations comprising:

automatically receiving edge relationship tables from multiple different authorized user identifiers;

automatically updating the first edge relationship table based on edge connections included in the edge relationship tables, which modifies confidence values of edge connections within the first edge relationship table; and generating an updated display of the shared knowledge graph to display a different combination of nodes and edges based on the confidence values of the edge connections that were modified within the first edge relationship table.

16. The system of claim 15, further comprising instructions that, when executed by the at least one processor, cause the system to carry out operations comprising determining the confidence value for the first edge connection in the first edge relationship table based on an edge interaction count indicating a number of times the first edge connection is included in received relationship tables and a user reputation weight applied to the edge interaction count.

17. A computer-implemented method comprising:

receiving a first edge relationship table having a first edge connection for connecting a first node and a second node according to a first edge relationship type;

generating a confidence value for the first edge connection based on a first set of attributes of the first edge relationship table, wherein generating the confidence value for the first edge connection includes weighting an edge interaction count for the first edge connection based on user authority scores of user identifiers;

determining, based on the confidence value of the first edge connection not satisfying an edge displaying threshold, to not include the first edge connection on a shared knowledge graph;

receiving a second edge relationship table having the first edge connection connecting the first node and the second node according to the first edge relationship type, wherein the second edge relationship table was generated in connection with creating a new knowledge graph;

generating an updated confidence value for the first edge connection based on the first set of attributes of the first edge relationship table and a second set of attributes of the second edge relationship table; and displaying the first edge connection in the shared knowledge graph based on the updated confidence value satisfying the edge displaying threshold.

18. The computer-implemented method of claim 17, wherein generating the updated confidence value for the first edge connection comprises generating the updated confidence value based on a set of factors including an edge interaction count, a user identifier authority weight, user interaction feedback, or negative connection indicators.

19. The computer-implemented method of claim 17, wherein the first edge relationship table is associated with a first user identifier and the second edge relationship table is associated with a second user identifier that differs from the first user identifier.

20. The computer-implemented method of claim 19, further comprising:

providing access to the shared knowledge graph on a server device to multiple different authorized user identifiers comprising the first user identifier and the second user identifier;

maintaining, at the server device, a dynamic edge relationship table for displaying the shared knowledge graph;

automatically updating the dynamic edge relationship table at the server device based on edge connections included in the dynamic edge relationship table, which causes confidence values of edge connections to be modified within the dynamic edge relationship table; and generating updated displays of the shared knowledge graph based on the confidence values of the edge connections that were modified within the dynamic edge relationship table.

* * * * *